United States Patent
Yamaguchi et al.

(10) Patent No.: US 6,797,415 B2
(45) Date of Patent: Sep. 28, 2004

(54) COBALT-NICKEL-IRON ALLOY THIN FILM AND METHOD OF FORMING THE SAME, AND THIN-FILM MAGNETIC HEAD AND METHOD OF MANUFACTURING THE SAME

(75) Inventors: Atsushi Yamaguchi, Tokyo (JP); Seiji Yari, Tokyo (JP); Tetsuya Mino, Tokyo (JP); Shuichi Okawa, Tokyo (JP); Shigeru Ichihara, Tokyo (JP)

(73) Assignee: TDK Corporation, Tokyo (JP)

( * ) Notice: Subject to any disclaimer, the term of this patent is extended or adjusted under 35 U.S.C. 154(b) by 92 days.

(21) Appl. No.: 09/942,678

(22) Filed: Aug. 31, 2001

(65) Prior Publication Data

US 2002/0118487 A1 Aug. 29, 2002

(30) Foreign Application Priority Data

Dec. 27, 2000 (JP) ........................................ 2000-396710

(51) Int. Cl.⁷ .................. B32B 15/00; G11B 5/127; G11B 5/147; G11B 5/33; C25D 3/56
(52) U.S. Cl. .................. 428/692; 428/694 T; 428/900; 205/255; 205/269; 205/270; 205/271; 360/110
(58) Field of Search .............................. 428/692, 694 T, 428/900; 427/128, 129, 130; 360/113, 110; 369/13.35–13.41; 205/255, 269–271

(56) References Cited

U.S. PATENT DOCUMENTS 4,661,216 A * 4/1987 Anderson et al. ........... 205/260
6,120,918 A 9/2000 Osaka et al.
6,507,464 B1 * 1/2003 Ohashi et al. ............... 360/317
2002/0106532 A1 * 8/2002 Yazawa et al. .............. 428/692

FOREIGN PATENT DOCUMENTS

| JP | A 62-256989 | 11/1987 |
| JP | A 8-241503 | 9/1996 |
| JP | B1 2821456 | 8/1998 |

OTHER PUBLICATIONS

"Electrodeposition of soft, high moment Co–Fe–Ni thin films" Xiomin Liu & Giovanni Zangari, Journal of Applied Physics, vol. 87 #9, May 1, 1999, pp. 5410–5412.*
Richard M. Bozorth, "FERROMAGNETISM", IEEE Magnetics Society 1993, p. 165.

* cited by examiner

Primary Examiner—Paul Thibodeau
Assistant Examiner—Nikolas J. Uhlir
(74) Attorney, Agent, or Firm—Oliff & Berridge, PLC

(57) ABSTRACT

A track width defining layer for defining a write track width of a thin-film magnetic head is made of a CoNiFe film formed through electroplating. The CoNiFe film contains 60 to 75 weight % cobalt, 10 to 20 weight % nickel, and 10 to 20 weight % iron, and has a crystal structure that is a mixture of a body-centered cubic structure phase and a face-centered cubic structure phase, in which Ib/If falls within the range of 0.3 to 0.7 inclusive where Ib represents the intensity of an X-ray diffracted from a (110)-plane of the body-centered cubic structure and If represents the intensity of an X-ray diffracted from a (111)-plane of the face-centered cubic structure. The pH of a plating bath for forming the CoNiFe film through electroplating is adjusted to 3.0 to 4.0 inclusive.

12 Claims, 19 Drawing Sheets

Ib/If

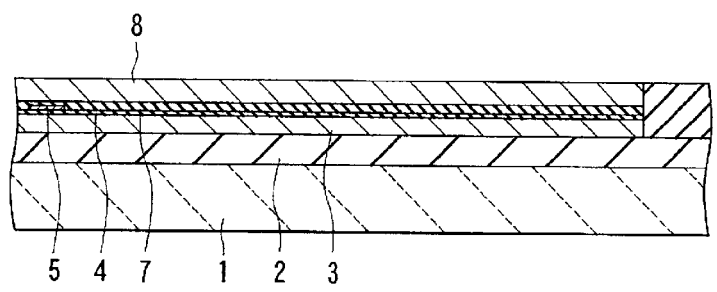
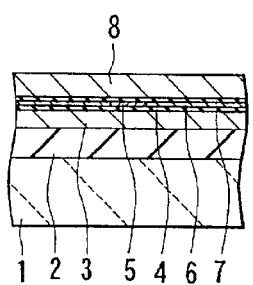
FIG. 1A  FIG. 1B
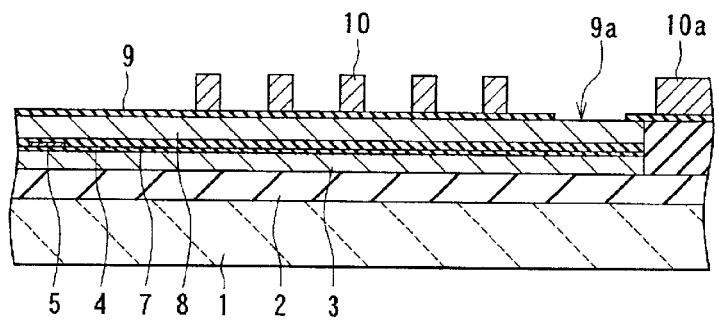
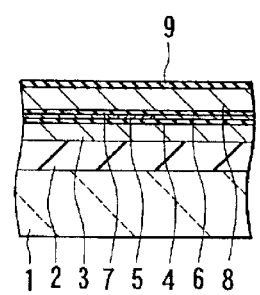
FIG. 2A  FIG. 2B

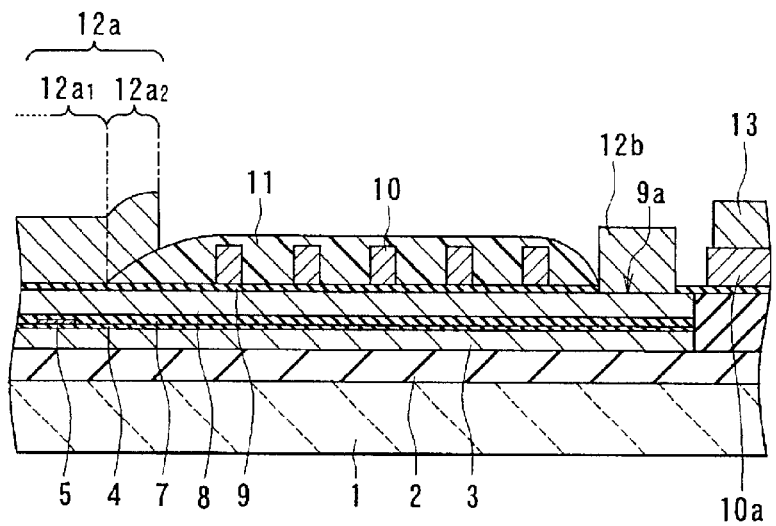
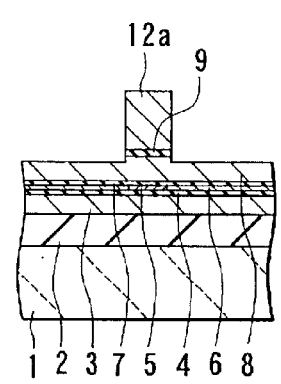
FIG. 3A  FIG. 3B
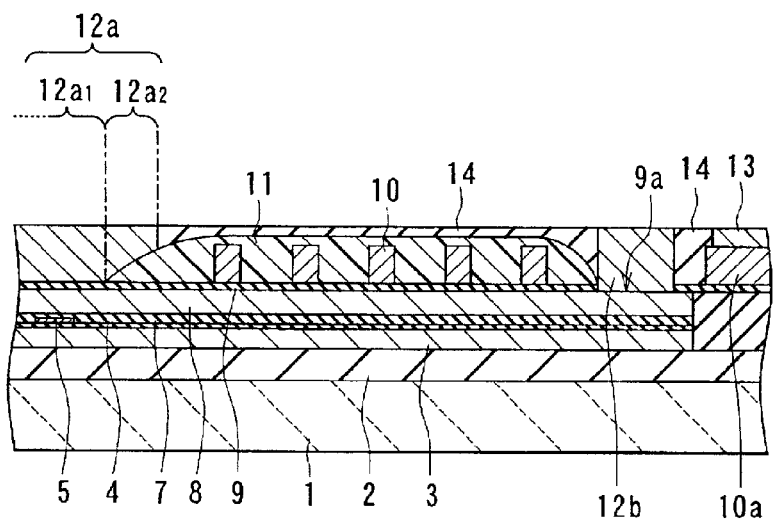
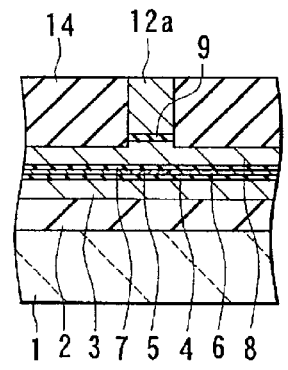
FIG. 4A  FIG. 4B

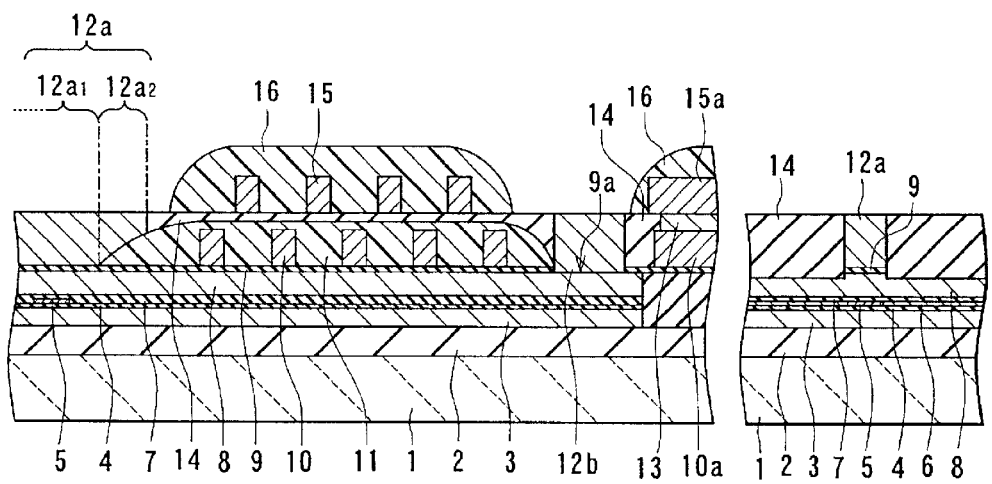
FIG. 5A                    FIG. 5B
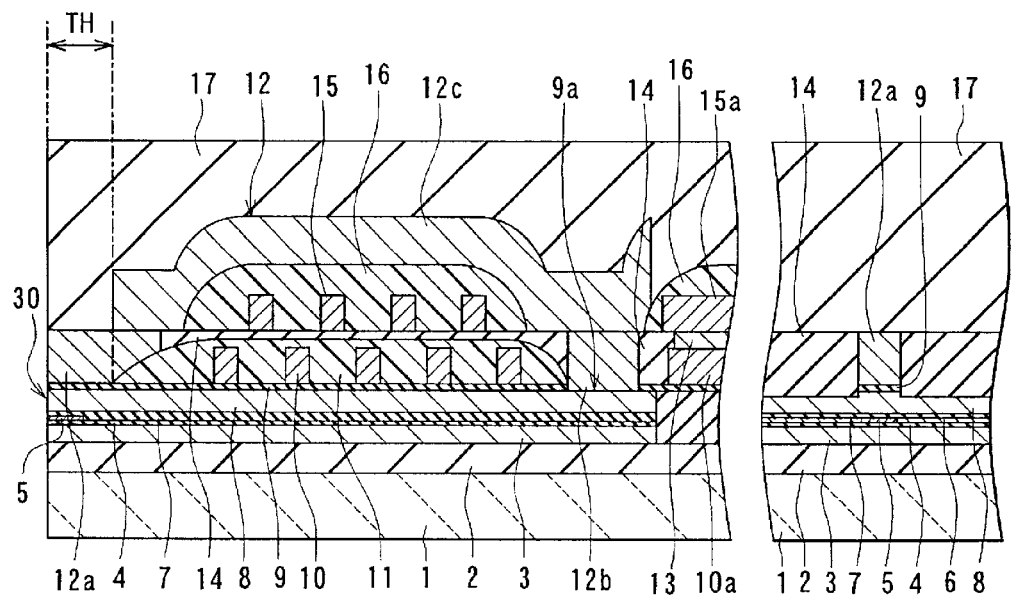
FIG. 6A                    FIG. 6B

COBALT-NICKEL-IRON ALLOY THIN FILM AND METHOD OF FORMING THE SAME, AND THIN-FILM MAGNETIC HEAD AND METHOD OF MANUFACTURING THE SAME

BACKGROUND OF THE INVENTION

1. Field of the Invention

The present invention relates to a cobalt-nickel-iron alloy thin film having a high saturation flux density and a method of forming the same, and a thin-film magnetic head utilizing such an alloy thin film and a method of manufacturing the same.

2. Description of the Related Art

Performance improvements in thin-film magnetic heads have been sought as a real recording density of hard disk drives has increased. Such thin-film magnetic heads include composite type thin-film magnetic heads that have been widely used. A composite head is made of a layered structure including a write (recording) head having an induction type electromagnetic transducer for writing and a read (reproducing) head having a magnetoresistive element (hereinafter also referred to as "MR element") for reading.

The write head has a bottom pole layer and a top pole layer each of which has a magnetic pole portion. The magnetic pole portions of the bottom and top pole layers are located on a side of the air bearing surface and opposed to each other. The write head further has a write gap layer provided between the magnetic pole portions of the bottom and top pole layers, and a thin-film coil provided such that at least a part of the coil is insulated from the bottom and top pole layers.

There are demands for improvements of the recording characteristics of such a write head to achieve recording in a higher density. One method of improving the recording characteristics of the write head is to use a material having a high saturation flux density as the material of the bottom and top pole layers.

One known material having a high saturation flux density is a cobalt-nickel-iron alloy. It is well known that a bulk material of a cobalt-nickel-iron alloy provides a high saturation flux density, as shown in "FERROMMAGNETIZM" authored by Bozorth and in FIG. 2 of Japanese Patent KOKAI Publication No. Sho 62-256989.

It has been reported that an electro-deposition film of a cobalt-nickel-iron alloy formed using electroplating also provides a high saturation flux density when it has a certain composition, as shown in Japanese Patent KOKAI Publication No. Hei 8-241503 and Japanese Patent No. 2821456.

It is natural to assume that a cobalt-nickel-iron alloy, whether it is formed as a bulk material or an electro-deposition film, will provide the same saturation flux density depending on its composition, as long as the composition is the same. In practice, however, an electro-deposition film of a cobalt-nickel-iron alloy formed using electroplating frequently has variation in its saturation flux density which is attributable to inclusion of impurities such as phosphorus (P), boron (B), and sulfur (S) produced in a eutetic manner from organic compounds included in the plating bath and plating conditions such as the current density, the temperature of the bath, and the pH of the bath.

In order for a magnetic material to be preferably used as magnetic layers of a thin-film magnetic head, it must have a soft magnetic property or, more specifically, a small magnetic coercive force, in addition to a high saturation flux density. A range of compositions of cobalt-nickel-iron alloy thin films having high saturation flux densities and preferable soft magnetic properties is a range in which the compositions have crystal structures that are mixtures of a body-centered cubic (bcc) structure phase and a face-centered cubic (fcc) structure phase, as described in the above-mentioned Japanese patent No. 2821456. However, it is difficult to control crystals in such a range of compositions, which is one of the causes of variation of a saturation flux density.

As described above, improvement of recording characteristics of a thin-film magnetic head can be expected from the use of cobalt-nickel-iron alloy thin films as magnetic pole layers of the thin-film magnetic head. However, in order to produce such thin-film magnetic heads on a mass production basis with stable and preferable recording characteristics, it is necessary to suppress variation of the saturation flux density of the cobalt-nickel-iron alloy thin films used for the magnetic pole layers.

OBJECTS AND SUMMARY OF THE INVENTION

It is a first object of the invention to provide a cobalt-nickel-iron alloy thin film having a preferable soft magnetic property and a stable and high saturation flux density, and to provide a method of forming the same.

It is a second object of the invention to provide a thin-film magnetic head in which cobalt-nickel-iron alloy thin films are used as magnetic layers to achieve preferable recording characteristics stably, and to provide a method of manufacturing the same.

A cobalt-nickel-iron alloy thin film according to the invention is a thin film containing 60 to 75 weight % cobalt (Co), 10 to 20 weight % nickel (Ni) and 10 to 20 weight % iron (Fe), and having a crystal structure that is a mixture of a body-centered cubic structure phase and a face-centered cubic structure phase, in which $Ib/If$ is in the range of 0.3 to 0.7 inclusive where $Ib$ represents the intensity of an X-ray diffracted from a (110)-plane of the body-centered cubic structure and $If$ represents the intensity of an X-ray diffracted from a (111)-plane of the face-centered cubic structure.

According to the cobalt-nickel-iron alloy thin film of the invention, in the above-described composition the value of $Ib/If$ is 0.3 or more and 0.7 or less. As a result, it is possible to achieve a preferable soft magnetic property and a stable and preferable high saturation flux density.

A method of forming a cobalt-nickel-iron alloy thin film of the invention is provided for forming a cobalt-nickel-iron alloy thin film containing 60 to 75 weight % cobalt (Co), 10 to 20 weight % nickel (Ni), and 10 to 20 weight % iron (Fe), and having a crystal structure that is a mixture of a body-centered cubic structure phase and a face-centered cubic structure phase through electroplating, wherein the cobalt-nickel-iron alloy thin film is formed such that $Ib/If$ falls within the range of 0.3 to 0.7 inclusive where $Ib$ represents the intensity of an X-ray diffracted from a (110)-plane of the body-centered cubic structure and $If$ represents the intensity of an X-ray diffracted from a (111)-plane of the face-centered cubic structure.

According to the method of forming a cobalt-nickel-iron alloy thin film of the invention, when the cobalt-nickel-iron alloy thin film having the above-described composition is formed through electroplating, the film is formed such that $Ib/If$ falls within the range of 0.3 to 0.7 inclusive. It is thereby possible to obtain a cobalt-nickel-iron alloy thin film having a preferable soft magnetic property and a stable and high saturation flux density.

In the method of forming a cobalt-nickel-iron alloy thin film of the invention, the pH of the plating bath for forming the cobalt-nickel-iron alloy thin film through electroplating may be adjusted to 3.0 to 4.0 inclusive.

In the method of forming a cobalt-nickel-iron alloy thin film of the invention, the value of Ib/If may be controlled by controlling the pH of the plating bath.

A thin-film magnetic head according to the invention comprises:
    a medium facing surface that faces toward a recording medium;
    a first magnetic layer and a second magnetic layer magnetically coupled to each other and including magnetic pole portions that are opposed to each other and placed in regions of the magnetic layers on a side of the medium facing surface, each of the magnetic layers including at least one layer;
    a gap layer provided between the magnetic pole portions of the first and second magnetic layers; and
    a thin-film coil at least a part of which is placed between the first and second magnetic layers, the at least part of the coil being insulated from the first and second magnetic layers, wherein:
        at least either of the first and second magnetic layers includes a part made of a cobalt-nickel-iron alloy thin film; and
        the cobalt-nickel-iron alloy thin film contains 60 to 75 weight % cobalt, 10 to 20 weight % nickel, and 10 to 20 weight % iron, and has a crystal structure that is a mixture of a body-centered cubic structure phase and a face-centered cubic structure phase, in which Ib/If is in the range of 0.3 to 0.7 inclusive where Ib represents the intensity of an X-ray diffracted from a (110)-plane of the body-centered cubic structure and If represents the intensity of an X-ray diffracted from a (111)-plane of the face-centered cubic structure.

In the thin-film magnetic head of the invention, at least either of the first and second magnetic layers includes a part made of the cobalt-nickel-iron alloy thin film as described above. It is therefore possible to provide preferable recording characteristics stably.

A method of manufacturing a thin-film magnetic head according to the invention is provided for manufacturing a thin-film magnetic head comprising: a medium facing surface that faces toward a recording medium; a first magnetic layer and a second magnetic layer magnetically coupled to each other and including magnetic pole portions that are opposed to each other and placed in regions of the magnetic layers on a side of the medium facing surface, each of the magnetic layers including at least one layer; a gap layer provided between the magnetic pole portions of the first and second magnetic layers; and a thin-film coil at least a part of which is placed between the first and second magnetic layers, the at least part of the coil being insulated from the first and second magnetic layers, wherein at least either of the first and second magnetic layers includes a part made of a cobalt-nickel-iron alloy thin film. The method includes the steps of: forming the first magnetic layer; forming the gap layer on the first magnetic layer; forming the second magnetic layer on the gap layer; and forming the thin-film coil. At least either of the steps of forming the first magnetic layer and the second magnetic layer includes a step of forming the cobalt-nickel-iron alloy thin film through electroplating, the cobalt-nickel-iron ally thin film containing 60 to 75 weight % cobalt, 10 to 20 weight % nickel, and 10 to 20 weight % iron, and having a crystal structure that is a mixture of a body-centered cubic structure phase and a face-centered cubic structure phase, in which Ib/If is in the range of 0.3 to 0.7 inclusive where Ib represents the intensity of an X-ray diffracted from a (110)-plane of a body-centered cubic structure and If represents the intensity of an X-ray diffracted from a (111)-plane of a face-centered cubic structure.

According to the method of manufacturing a thin-film magnetic head of the invention, since the cobalt-nickel-iron alloy thin film used for at least either of the first and second magnetic layers is formed as described above, it is possible to manufacture a thin-film magnetic head having stable and preferable recording characteristics.

In the method of manufacturing a thin-film magnetic head of the invention, the pH of a plating bath for forming the cobalt-nickel-iron alloy thin film through electroplating may be adjusted to 3.0 to 4.0 inclusive.

In the method of manufacturing a thin-film magnetic head of the invention, the value of Ib/If value may be controlled by controlling the pH of the plating bath.

Other and further objects, features and advantages of the invention will appear fully from the following description.

BRIEF DESCRIPTION OF THE DRAWINGS

FIG. 1A and FIG. 1B are cross-sections for schematically illustrating a method of manufacturing a thin-film magnetic head of an embodiment of the invention.

FIG. 2A and FIG. 2B are cross-sections for illustrating a step that follows FIG. 1A and FIG. 1B.

FIG. 3A and FIG. 3B are cross-sections for illustrating a step that follows FIG. 2A and FIG. 2B.

FIG. 4A and FIG. 4B are cross-sections for illustrating a step that follows FIG. 3A and FIG. 3B.

FIG. 5A and FIG. 5B are cross-sections for illustrating a step that follows FIG. 4A and FIG. 4B.

FIG. 6A and FIG. 6B are cross-sections for illustrating a step that follows FIG. 5A and FIG. 5B.

DETAILED DESCRIPTION OF THE PREFERRED EMBODIMENTS

Figure 7:
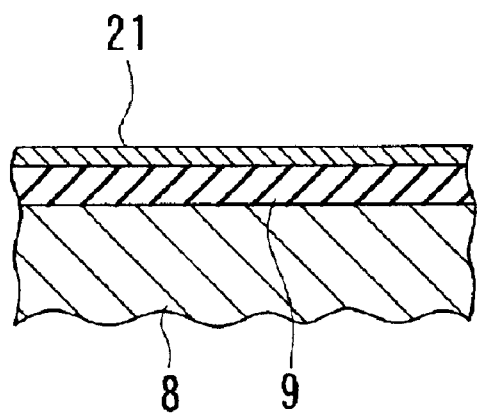
FIG. 7 is a cross section for illustrating a method of forming a track width defining layer of a top pole layer in the embodiment of the invention.

Preferred embodiments of the invention will now be described in detail with reference to the accompanying drawings. Reference is now made to FIGS. 1A to 6A and to FIGS. 1B to 6B to describe a method of manufacturing a thin-film magnetic head of a first embodiment of the invention. FIGS. 1A to 16 are cross sections orthogonal to an air bearing surface, and FIGS. 1B to 6B are cross sections parallel to the air bearing surface.

In the method of manufacturing a thin-film magnetic head of the present embodiment, as shown in FIGS. 1A and 1B, an insulating layer 2 made of an insulating material such as alumina ($Al_2O_3$) and having a thickness of 1 to 5 µm, for example, is formed on a substrate 1 made of ceramic materials such as aluminum oxide and titanium carbide ($Al_2O_3$-TiC) through sputtering or the like. On the insulating layer 2, a bottom shield layer 3 made of a magnetic material such as Permalloy and having a thickness of about 3 µm is formed through sputtering, electroplating or the like, for making a read head.

Next, on the bottom shield layer 3, a bottom shield gap film 4 made of an insulating material such as alumina is formed through sputtering or the like to a thickness of 10 to 200 nm, for example. Next, on the bottom shield gap film 4, an MR element 5 for reading having a thickness of tens of nanometers, for example, is formed through sputtering or the like. The MR element may be an element utilizing a magnetosensitive film exhibiting a magnetoresistivity, such as an AMR (anisotropic magnetoresistive) element, a GMR (giant magnetoresistive) element, or a TMR (tunnel magnetoresistive) element.

Next, on the bottom shield gap film 4, a pair of electrode layers 6 having a thickness of tens of nanometers are formed through sputtering or the like. The electrode layers 6 are electrically connected to the MR element 5. Next, on the bottom shield gap film 4 and the MR element 5, a top shield gap film 7 made of an insulating material such as alumina and having a thickness of 10 to 200 nm, for example, is formed through sputtering or the like.

The above-described layers that make up the read head are patterned through an etching process or a lift-off process or a combination thereof, using patterned resists.

Next, on the top shield gap film 7, a top-shield-layer-cum-bottom-pole-layer (hereinafter called a bottom pole layer) 8 having a thickness of about 3 to 4 µm, for example, is selectively formed. The bottom pole layer 8 is made of a magnetic material and used for both a read head and a write head. The magnetic material used for the bottom pole layer 8 is a soft magnetic material such as NiFe, CoFe, CoFeNi, or FeN. The bottom pole layer 8 is formed through sputtering or electroplating or the like.

In place of the bottom pole layer 8, there may be provided a top shield layer, a separation layer made of a non-magnetic material such as alumina formed on the top shield layer through sputtering or the like, and a bottom pole layer formed on the separation layer.

Next, as shown in FIG. 2A and FIG. 2B, a write gap layer 9 made of an insulating material such as alumina and having a thickness of 150 to 300 nm, for example, is formed on the bottom pole layer 8 through sputtering or the like. Next, a portion of the gap layer 9 located in the center portion of a thin-film coil to be described later is etched to form a contact hole 9A for making a magnetic path.

Next, a first layer 10 of the thin-film coil made of copper (Cu), for example, is formed on the write gap layer 9 to a thickness of 2 to 3 µm, for example. In FIG. 2A, reference numeral 10a represents a connecting section of the first layer 10 for connection to a second layer 15 of the thin-film coil to be described later. The first layer 10 is wound around the contact hole 9a.

Next, as shown in FIGS. 3A and 3B, an insulating layer 11 is formed in a predetermined pattern to cover the first layer 10 of the thin-film coil and the write gap layer 9 around the same. The insulating layer 11 is made of an organic insulating material which exhibits fluidity when heated, such as photoresist. Next, heat treatment is performed at a predetermined temperature to flatten the surface of the insulating layer 11. As a result of the heat treatment, each of the outer and inner circumferential ends of the insulating layer 11 has a rounded and inclined surface configuration.

A track width defining layer 12a of a top pole layer 12 is formed from a magnetic material for making a write head on the write gap layer 9 and the insulating layer 11. The track width defining layer 12a is formed in a region ranging from an inclined portion of the insulating layer 11 on a side of an air bearing surface 30 to be described later to the air bearing surface 30. The top pole layer 12 is made up of the track width defining layer 12a, and a coupling portion layer 12b and a yoke portion layer 12c to be described later. As will be detailed later, the track width defining layer 12a is formed through electroplating.

The track width defining layer 12a has an end section $12a_1$ and a connecting section $12a_2$. The end section $12a_1$ is to be a pole portion of the top pole layer 12 and is formed on the write gap layer 9. The connecting section $12a_2$ is formed on the inclined portion of the insulating layer 11 on a side of the air bearing surface 30 and is connected to the yoke portion layer 12c. The width of the end section $12a_1$ is equal to the write track width. That is, the end section $12a_1$ defines the write track width.

When the track width defining layer 12a is formed, the coupling portion layer 12b made of a magnetic material is formed on the contact hole 9a, and a connecting layer 13 made of a magnetic material is formed on the connecting section 10a, at the same time. The coupling portion layer 12b constitutes a portion of the top pole layer 12 that is magnetically coupled to the bottom pole layer 8.

Next, the write gap layer 9 and at least a part of the pole portion of the bottom pole layer 8 located on the side of the write gap layer 9 are etched around the track width defining layer 12a, using the track width defining layer 12a as a mask. For example, reactive ion etching is used to etch the write gap layer 9, and ion milling is used to etch the bottom pole layer 8. The resultant structure as shown in FIG. 3B is called a trim structure, in which sidewalls of the pole portion of the top pole layer 12 (the end section $12a_1$ of the track width defining layer 12a), the write gap layer 9 and at least part of the pole portion of the bottom pole layer 8 are formed vertically in a self-aligned manner.

Next, as shown in FIG. 4A and FIG. 4B, an insulating layer 14 made of an inorganic insulating material such as alumina is formed over the entire surface to a thickness of 3 to 4 µm, for example. Next, the insulating layer 14 is polished through chemical mechanical polishing (CMP), for example, such that the surfaces of the track width defining layer 12a, coupling portion layer 12b, and connecting layer 13 are exposed and such that the surface is flattened.

Next, as shown in FIGS. 5A and 5B, a second layer 15 of the thin-film coil made of copper (Cu), for example, is formed on the flattened insulating layer 14 to a thickness of 2 to 3 µm, for example. In FIG. 5A, reference numeral 15a represents a connecting section of the second layer 15 which is connected to the connecting section 10a of the first layer 10 of the coil through the connecting layer 13. The second layer 15 is wound around the coupling portion layer 12b.

Next, an insulating layer 16 is formed in a predetermined pattern so as to cover the second layer 15 of the thin-film coil and the insulating layer 14 around the same. The insulating layer 16 is made of an organic insulating material which exhibits fluidity when heated, such as photoresist. Next, heat treatment is performed at a predetermined temperature to flatten the surface of the insulating layer 16. As a result of the heat treatment, each of the inner and outer circumferential ends of the insulating layer 16 has a rounded and inclined surface configuration.

Next, as shown in FIG. 6A and FIG. 6B, the yoke portion layer 12c constituting a yoke portion of the top pole layer 12 is formed from a magnetic material used for making the write head, such as Permalloy, on the track width defining layer 12a, the insulating layers 14 and 16 and the coupling portion layer 12b. The yoke portion layer 12c is formed through sputtering, electroplating, or the like. An end of the yoke portion 12c facing the air bearing surface 30 is located apart from the air bearing surface 30. The yoke portion layer 12c is connected to the bottom pole layer 8 through the coupling portion layer 12b.

Next, an overcoat layer 17 of alumina, for example, is formed to cover the entire surface. Finally, the slider having the above-described layers is mechanically processed to form the air bearing surface 30 of the thin-film magnetic head including the write head and the read head, thereby completing the thin-film magnetic head.

The thin-film magnetic head of the present embodiment produced as described above has a medium facing surface (air bearing surface 30) which faces a recording medium, and the read head and the write head (induction-type electromagnetic transducer). The read head has: the MR element 5; and the bottom shield layer 3 and the top shield layer (bottom pole layer 8) for shielding the MR element 5. Portions of the bottom shield layer 3 and the top shield layer located in a region on a side of the air bearing surface 30 are opposed to each other, the MR element 5 being placed between these portions.

The write head has the bottom pole layer 8 and top pole layer 12 magnetically coupled to each other, each of which includes at least one layer. The bottom pole layer 8 and the top pole layer 12 include the pole portions that are opposed to each other and placed in regions on a side of the air bearing surface 30. The write head further has: the write gap layer 9 provided between the pole portion of the bottom pole layer 8 and the pole portion of the top pole layer 12; and the thin-film coil including the layers 10 and 15. At least part of the coil is disposed between the bottom pole layer 8 and the top pole layer 12, the part being insulated from the bottom and top pole layers. As shown in FIG. 6A, in the thin-film magnetic head of the present embodiment, the length from the air bearing surface 30 to the end of the insulating layer 11 on a side of the air bearing surface 30 is a throat height TH. The throat height is the length (height) of portions of the two magnetic pole layers facing each other with the write gap layer in between, between the air-bearing-surface-side end and the other end.

In the present embodiment, the bottom pole layer 8 corresponds to the first magnetic layer of the invention, and the top pole layer 12 corresponds to the second magnetic layer of the invention.

A method of forming the track width defining layer 12a of the top pole layer 12 will now be described in detail with reference to FIGS. 7 through 11. In this method of forming the track width defining layer 12a, a base film 21 to serve as a base for plating is first formed on the write gap layer 9 through sputtering, for example, as shown in FIG. 7. The base film 21 is made of a magnetic material.

Figure 8:
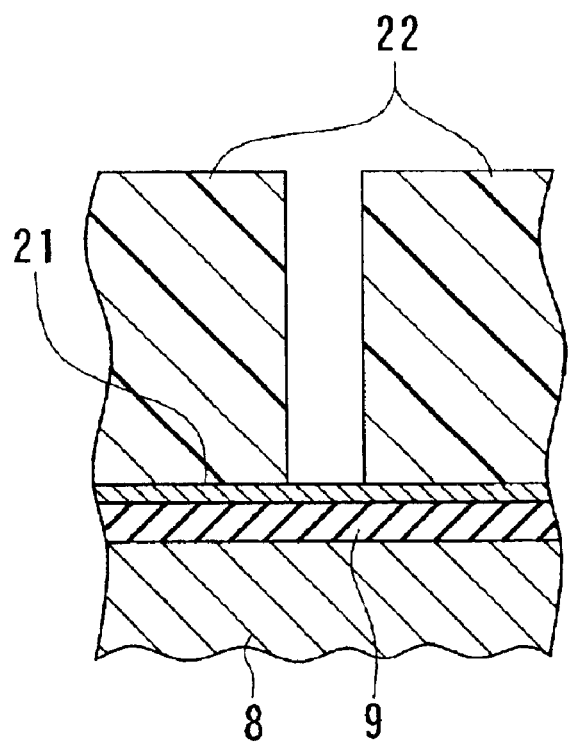
FIG. 8 is a cross-section for illustrating a step that follows FIG. 7.

Next, as shown in FIG. 8, a photoresist layer is formed on the base film 21, and the photoresist layer is patterned using a photolithographic process to form a frame 22 for plating.

Figure 9:
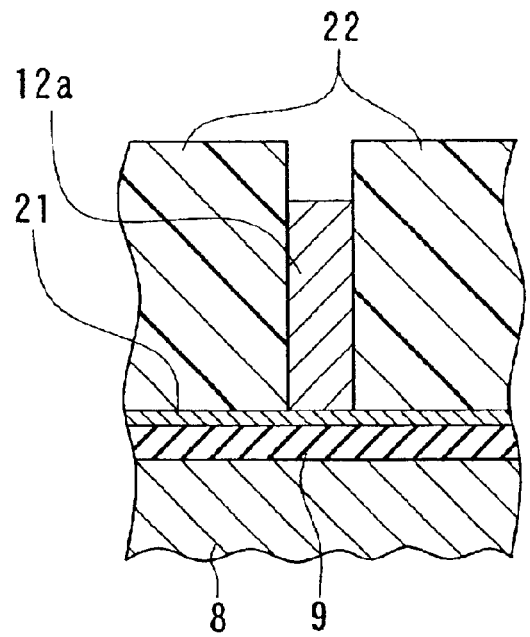
FIG. 9 is a cross-section for illustrating a step that follows FIG. 8.

Next, as shown in FIG. 9, electroplating is performed with the frame 22, using the base film 21 formed as described above as an electrode, thereby forming the track width defining layer 12a on the base film 21.

Figure 10:
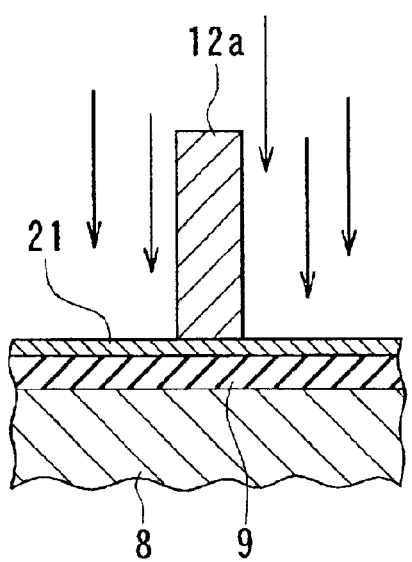
FIG. 10 is a cross-section for illustrating a step that follows FIG. 9.
Figure 11:
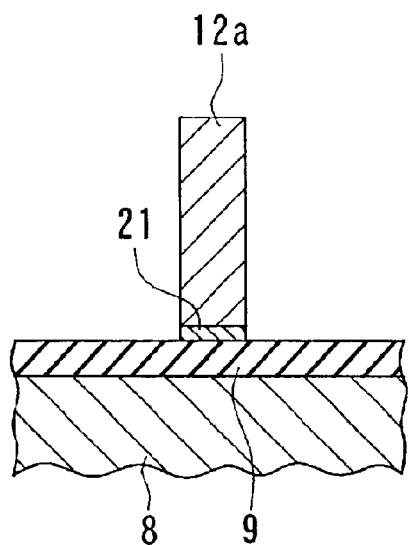
FIG. 11 is a cross-section for illustrating a step that follows FIG. 11.

Next, as shown in FIG. 10, the frame 22 is removed, and unnecessary part of the base film 21 that is other than the part located under the track width defining layer 12a is removed through dry etching such as ion milling. Through the foregoing process, the base film 21 and the track width defining layer 12a are formed on the write gap layer 9 as shown in FIG. 11.

In the present embodiment, the track width defining layer 12a is made of a cobalt-nickel-iron alloy thin film of the embodiment. A detailed description will now be made on the cobalt-nickel-iron alloy thin film (hereinafter also referred to as "CoNiFe film") of the present embodiment and a method of forming the CoNiFe film through electroplating.

The CoNiFe film of the present embodiment is used for the track width defining layer 12a that forms a part of the top pole layer 12 of the thin-film magnetic head. It is therefore desired that the CoNiFe film has a high saturation flux density and a preferable soft magnetic property or a small coersive force. In the present embodiment, accordingly, the CoNiFe film has a composition containing 60 to 75 weight % cobalt, 10 to 20 weight % nickel, and 10 to 20 weight % iron, so as to achieve a saturation flux density of the CoNiFe film of 1.7 T (teslas) or more. Further, in the present embodiment, in order to provide the CoNiFe film with a preferable soft magnetic property, the CoNiFe film has a crystal structure that is a mixture of a body-centered cubic (bcc) structure phase and a face-centered cubic (fcc) structure phase. When the CoNiFe film has the above-described composition, the saturation flux density of the CoNiFe film can be 1.7 T or more, as shown in "FERROMAGNETIZM" authored by Bozorth and FIG. 2 of Japanese Patent KOKAI publication No. Sho 62-256989. Further, in the above-described composition, preferable soft magnetic property of the CoNiFe film is attained by providing the CoNiFe film with a crystal structure that is a mixture of a body-centered cubic structure phase and a face-centered cubic structure phase.

In the present embodiment, when the CoNiFe film having the above-described composition and the above-described crystal structure is formed through electroplating, in order to consistently obtain CoNiFe films having a saturation flux density as high as 1.7 T or more, the following conditions are set for the CoNiFe film and the method of forming the same. That is, according to the present embodiment, the CoNiFe film is formed such that Ib/If falls within the range of 0.3 to 0.7 inclusive where Ib represents the intensity of an X-ray diffracted from a (110)-plane of the body-centered cubic structure of the CoNiFe film, and If represents the intensity of an X-ray diffracted from a (111)-plane of the face-centered cubic structure. In addition, in the method of forming the CoNiFe film of the present embodiment, the pH of a plating bath for forming the CoNiFe film through electroplating is adjusted to 3.0 to 4.0 inclusive. Further, in the method of forming the CoNiFe film of the present embodiment, the value of Ib/If is controlled by controlling the pH of the plating bath.

A detailed description will now be made on the details and results of two experiments conducted to determine the above-described conditions. First, a description will be made on a first experiment conducted to examine the relationship between a composition of the CoNiFe film and pH of the plating bath. In the first experiment, six samples of the CoNiFe film were prepared using plating baths having the same composition and varied pH. The composition of the plating bath used for the first experiment is shown in the following table. The temperature of the plating bath used for the first experiment was 22° C., and the electro-deposition current density was 5.8 mA/cm$^2$. In the first experiment, sulfuric acid or hydrochloric acid was added to the plating bath to decrease the pH thereof, and ammonia was added to the plating bath to increase the pH thereof, whereby the pH of the plating bath was adjusted.

TABLE 1

| Component | Concentration (g/L) |
|---|---|
| nickel sulfate hexahydrate | 36.5 |
| nickel chloride hexahydrate | 7.3 |
| cobalt sulfate heptahydrate | 18.6 |
| iron sulfate heptahydrate | 4.4 |
| boric acid | 31 |
| sodium saccharate | 0.5 |
| sodium lauryl sulfate | 0.01 |

The following table shows the relationship between the pH of the plating bath when forming the CoNiFe film and the composition of the CoNiFe film observed on the six samples of the CoNiFe film prepared in the first experiment. In the following tables and drawings, weight % is abbreviated to wt %.

TABLE 2

| Sample No. | pH | Co (wt %) | Ni (wt %) | Fe (wt %) |
|---|---|---|---|---|
| 1 | 3.20 | 67.44 | 14.88 | 17.68 |
| 2 | 3.10 | 67.43 | 14.92 | 17.65 |
| 3 | 3.01 | 67.44 | 14.88 | 17.68 |
| 4 | 2.91 | 67.39 | 15.18 | 17.43 |
| 5 | 2.80 | 67.44 | 15.30 | 17.26 |
| 6 | 2.55 | 67.47 | 16.13 | 16.44 |

Figure 12:
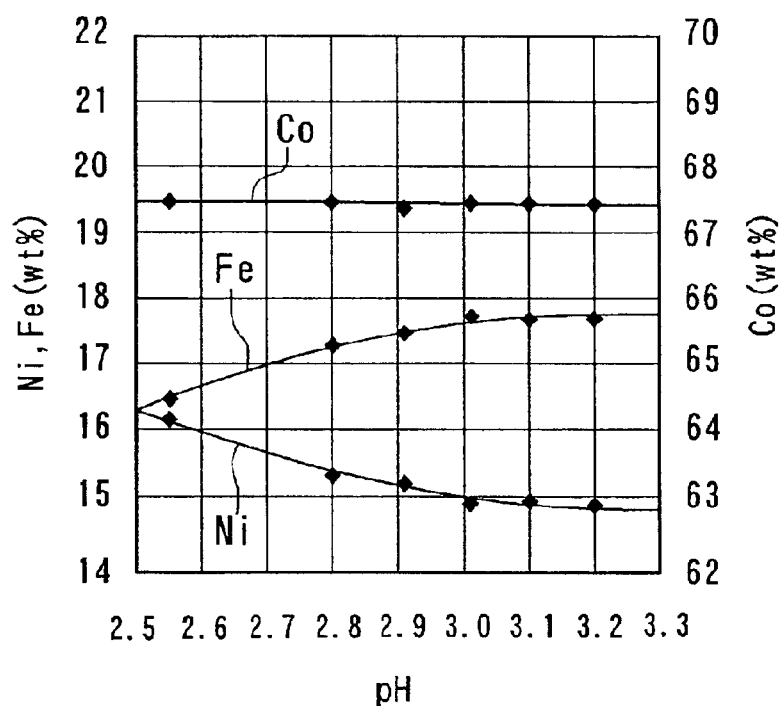
FIG. 12 is a characteristic diagram illustrating the relationship between pH of a plating bath when forming the CoNiFe films and the compositions of the CoNiFe films observed on six samples prepared in a first experiment.

FIG. 12 is a graphical representation of the relationship between the pH of the plating bath and the composition of the CoNiFe film shown in the above table. FIG. 12 shows that the composition of the CoNiFe film changes depending on the pH of the plating bath when the pH is lower than 3.0, and that the composition of the CoNiFe film is substantially constant regardless of the pH of the plating bath when the pH is 3.0 or more.

A second experiment will now be described. In the second experiment, 23 samples of the CoNiFe film were prepared with the composition and pH of the plating bath varied, and the samples were examined to check the pH values of the plating bath, compositions of the CoNiFe films, the Ib/If values of the CoNiFe films, and the saturation flux densities BS of the CoNiFe films. Ranges of the compositions of the plating bath used in the second experiment are shown in the following table. The temperature of the plating bath used for the second experiment was 22° C.; the pH was in the range of 2.9 to 3.4; and the electro-deposition current density was 5.8 mA/cm². In the second experiment, sulfuric acid or hydrochloric acid was added to the plating bath to decrease the pH thereof, and ammonia was added to the plating bath to increase the pH thereof, whereby the pH of the plating bath was adjusted. Referring to the compositions of the 23 samples prepared in the second experiment, cobalt contents ranged from 65 to 74 weight %; nickel contents ranged from 12 to 16 weight %; and iron contents ranged from 14 to 20 weight %.

TABLE 3

| Component | Concentration (g/L) |
|---|---|
| nickel sulfate hexahydrate | 36 to 40 |
| nickel chloride hexahydrate | 0 to 8 |
| cobalt sulfate heptahydrate | 12 to 22 |
| iron sulfate heptahydrate | 3.6 to 4.4 |
| boric acid | 26.5 to 46.5 |
| sodium saccharate | 0.5 |
| sodium lauryl sulfate | 0.01 |

The following two tables show the relationship among the pH of the plating bath when forming the CoNiFe film, the composition of the CoNiFe film, the Ib/If value of the CoNiFe film, and the saturation flux density Bs of the CoNiFe film observed on the 23 samples of the CoNiFe film prepared in the second experiment.

TABLE 4

| Sample No. | pH | Co (wt %) | Ni (wt %) | Fe (wt %) | Ib/If | Bs (T) |
|---|---|---|---|---|---|---|
| 1 | 3.01 | 67.44 | 14.88 | 17.68 | 0.40 | 1.763 |
| 2 | 3.04 | 67.29 | 14.85 | 17.85 | 0.42 | 1.720 |
| 3 | 3.09 | 67.47 | 15.37 | 17.16 | 0.40 | 1.731 |
| 4 | 3.37 | 67.47 | 14.87 | 17.69 | 0.44 | 1.720 |
| 5 | 3.39 | 67.53 | 14.98 | 17.50 | 0.36 | 1.731 |
| 6 | 3.40 | 67.44 | 14.92 | 17.64 | 0.42 | 1.731 |
| 7 | 3.04 | 67.50 | 14.96 | 17.54 | 0.34 | 1.698 |
| 8 | 3.38 | 67.37 | 14.83 | 17.81 | 0.43 | 1.774 |
| 9 | 3.23 | 67.30 | 14.79 | 17.91 | 0.41 | 1.720 |
| 10 | 3.23 | 67.42 | 14.79 | 17.79 | 0.42 | 1.698 |

TABLE 5

| Sample No. | pH | Co (wt %) | Ni (wt %) | Fe (wt %) | Ib/If | Bs (T) |
|---|---|---|---|---|---|---|
| 11 | 3.23 | 67.35 | 14.81 | 17.84 | 0.39 | 1.698 |
| 12 | 3.24 | 67.40 | 14.80 | 17.80 | 0.37 | 1.709 |
| 13 | 3.02 | 67.29 | 14.91 | 17.79 | 0.37 | 1.622 |
| 14 | 3.03 | 67.31 | 14.88 | 17.81 | 0.35 | 1.687 |
| 15 | 3.21 | 67.32 | 14.93 | 17.76 | 0.42 | 1.742 |
| 16 | 2.93 | 67.30 | 15.15 | 17.55 | 0.34 | 1.655 |
| 17 | 3.20 | 65.35 | 15.48 | 19.17 | 0.68 | 1.763 |
| 18 | 3.17 | 67.61 | 14.54 | 17.85 | 0.54 | 1.774 |
| 19 | 3.13 | 69.74 | 13.50 | 16.76 | 0.36 | 1.763 |
| 20 | 3.09 | 73.14 | 12.05 | 14.81 | 0.14 | 1.655 |
| 21 | 3.25 | 67.54 | 14.44 | 18.02 | 0.52 | 1.763 |
| 22 | 3.32 | 69.50 | 13.47 | 17.02 | 0.38 | 1.774 |
| 23 | 3.33 | 71.19 | 12.84 | 15.97 | 0.21 | 1.676 |

Since the plating bath used for the experiments included sodium saccharate which is a sulfuric organic compound, sulfer on the order of 0.1 weight % was deposited on the CoNiFe films in a eutectic manner. Such a content is not so great as to affect the saturation flux density Bs of the CoNiFe films.

FIGS. 15 through 37 show results of measurement of X-ray diffraction intensity on the samples with sample numbers 1 through 23 prepared in the second experiment in the order of the sample numbers. The Ib/If values in the above table were calculated from the results of measurement shown in FIGS. 15 through 37. In FIGS. 15 through 37, fcc (111) represents an angle at which a diffracted ray occurs from a (111)-plane of a face-centered cubic structure; bcc (110) represents an angle at which a diffracted ray occurs from a (110)-plane of a body-centered cubic structure; and fcc (200) represents an angle at which a diffracted ray occurs from a (200)-plane of a face-centered cubic structure. In FIGS. 15 through 37, X-ray diffraction intensity may be in any unit.

Figure 13:
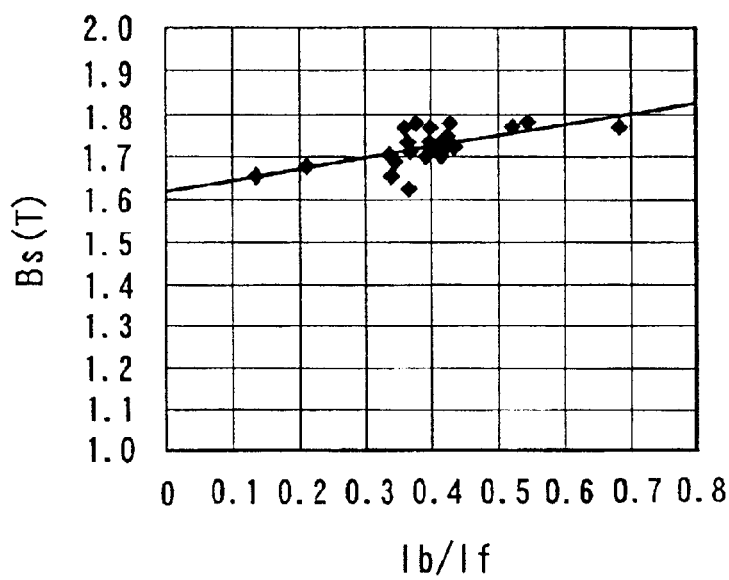
FIG. 13 is a characteristic diagram illustrating the relationship between Ib/If values and saturation flux densities Bs of samples with sample numbers 1 through 23 prepared in a second experiment.

FIG. 13 shows the relationship between the Ib/If values and the saturation flux densities Bs of the samples with sample numbers 1 through 23 prepared in the second experiment. The straight line in FIG. 13 was decided using the least squares method. It is apparent from FIG. 13 that an increase in the Ib/If value is accompanied by an increase in the saturation flux density Bs. FIG. 13 also shows that the saturation flux density Bs is 1.7 T or more when the Ib/If value is 0.3 or more. It is therefore understood that, in order to obtain a CoNiFe film whose saturation flux density Bs stably stays at 1.7 T or more like that of a bulk material of a cobalt-nickel-iron alloy through electroplating, it is preferable to form the CoNiFe film such that the value of Ib/If reaches 0.3 or more. The saturation flux density obtained from the range of compositions of the CoNiFe films according to the present embodiment ranges from about 1.7 to 1.8 T. It is apparent from FIG. 13 that the saturation flux density Bs of 1.7 to 1.8 T is attained when the value of Ib/If ranges from 0.3 to 0.7. Therefore, in the present embodiment the CoNiFe film is formed such that the value of Ib/If falls within the range of 0.3 to 0.7 inclusive.

Figure 14:
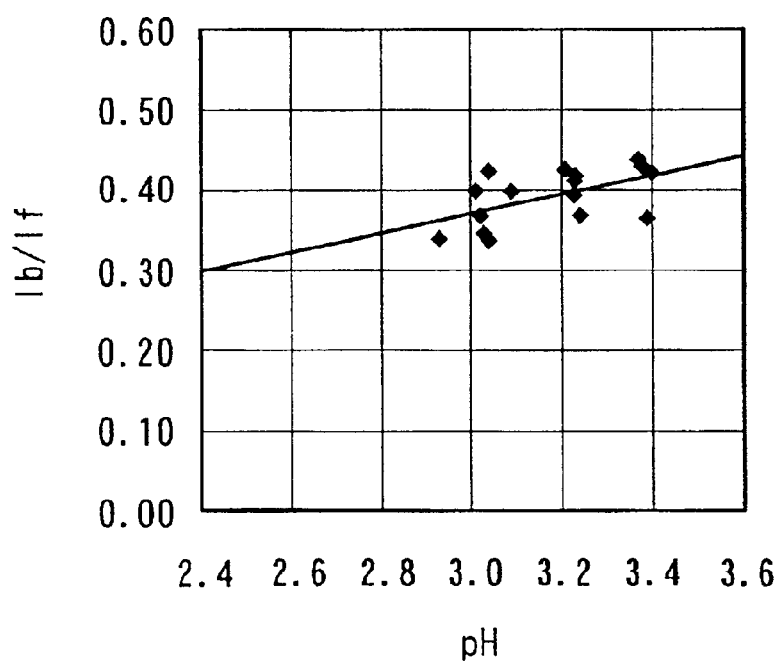
FIG. 14 is a characteristic diagram illustrating the relationship between the pH of the plating bath when forming the film and the Ib/If value observed on the samples with sample numbers 1 through 16 prepared in the second experiment.
Figure 15:
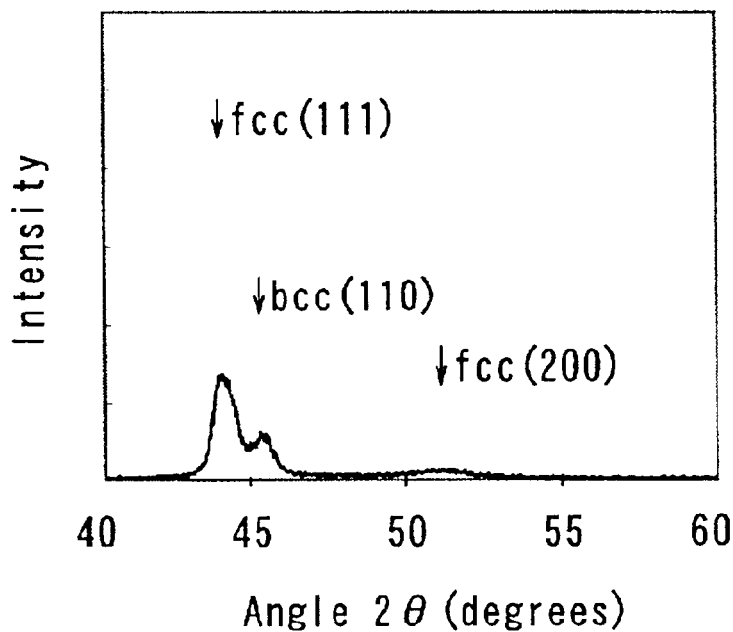
FIG. 15 is a characteristic diagram illustrating results of measurement of X-ray diffraction intensity on the sample with sample number 1 prepared in the second experiment.
Figure 16:
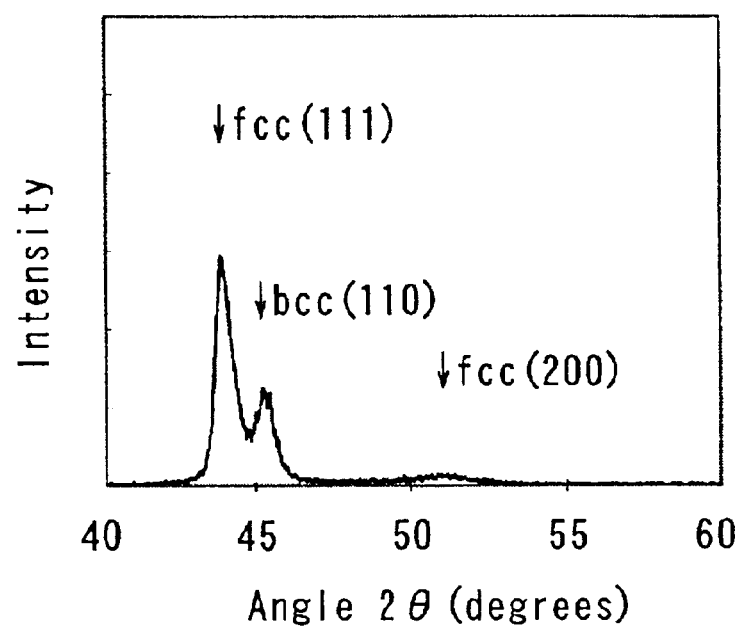
FIG. 16 is a characteristic diagram illustrating results of measurement of X-ray diffraction intensity on the sample with sample number 2 prepared in the second experiment.
Figure 17:
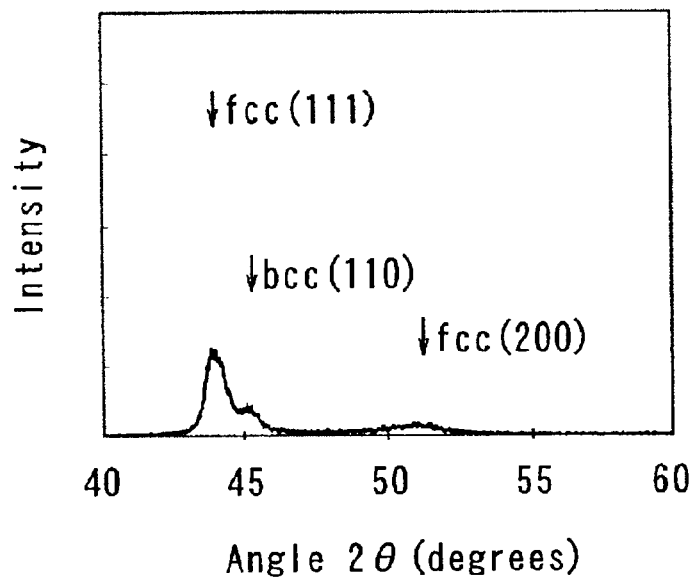
FIG. 17 is a characteristic diagram illustrating results of measurement of X-ray diffraction intensity on the sample with sample number 3 prepared in the second experiment.
Figure 18:
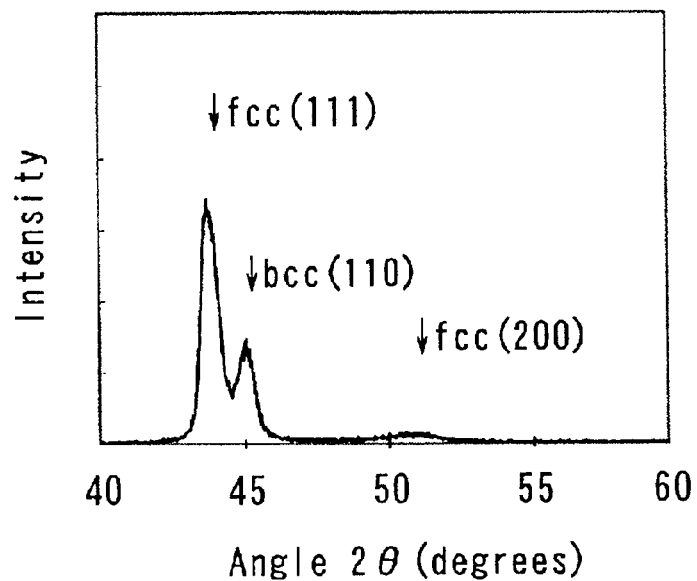
FIG. 18 is a characteristic diagram illustrating results of measurement of X-ray diffraction intensity on the sample with sample number 4 prepared in the second experiment.
Figure 19:
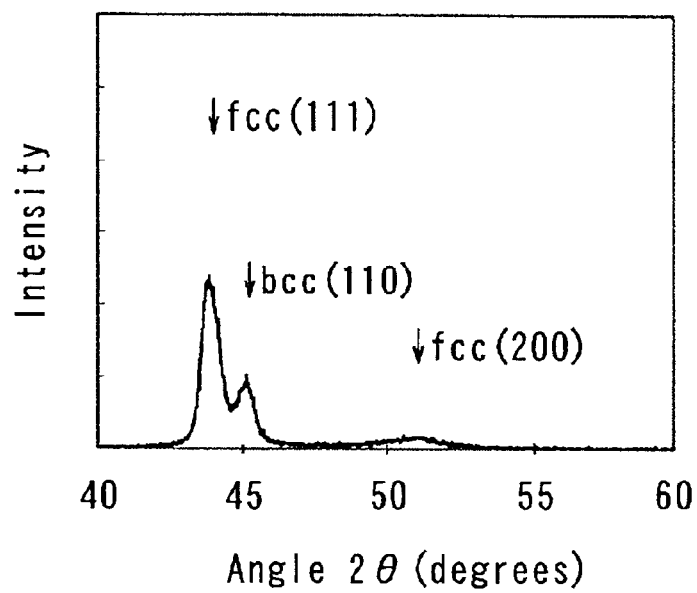
FIG. 19 is a characteristic diagram illustrating results of measurement of X-ray diffraction intensity on the sample with sample number 5 prepared in the second experiment.
Figure 20:
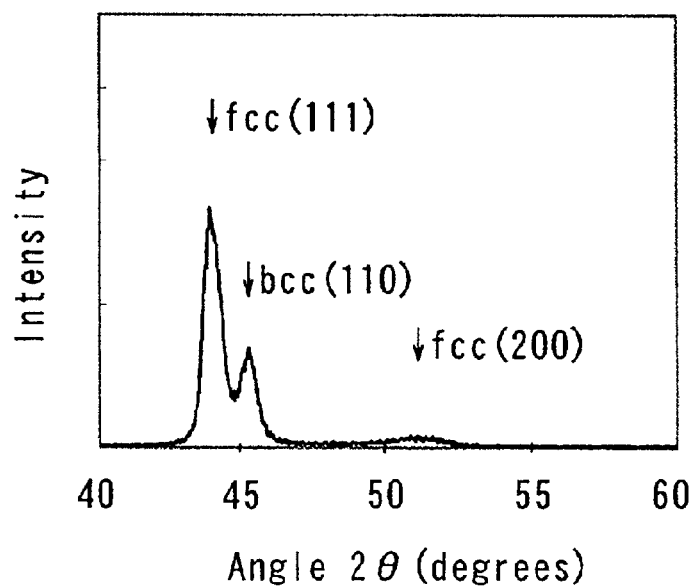
FIG. 20 is a characteristic diagram illustrating results of measurement of X-ray diffraction intensity on the sample with sample number 6 prepared in the second experiment.
Figure 21:
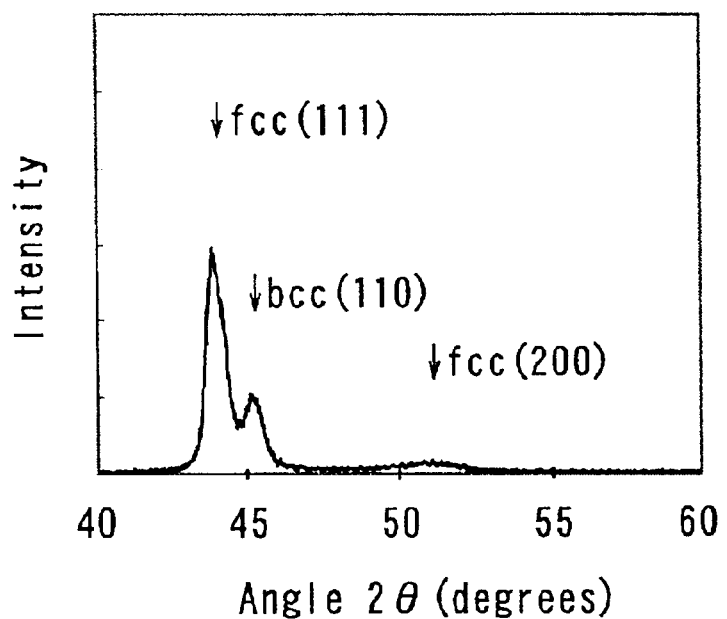
FIG. 21 is a characteristic diagram illustrating results of measurement of X-ray diffraction intensity on the sample with sample number 7 prepared in the second experiment.
Figure 22:
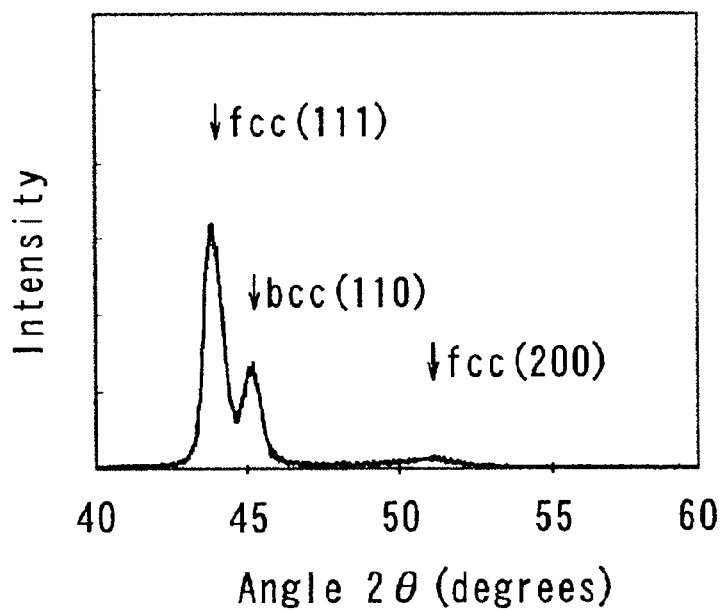
FIG. 22 is a characteristic diagram illustrating results of measurement of X-ray diffraction intensity on the sample with sample number 8 prepared in the second experiment.
Figure 23:
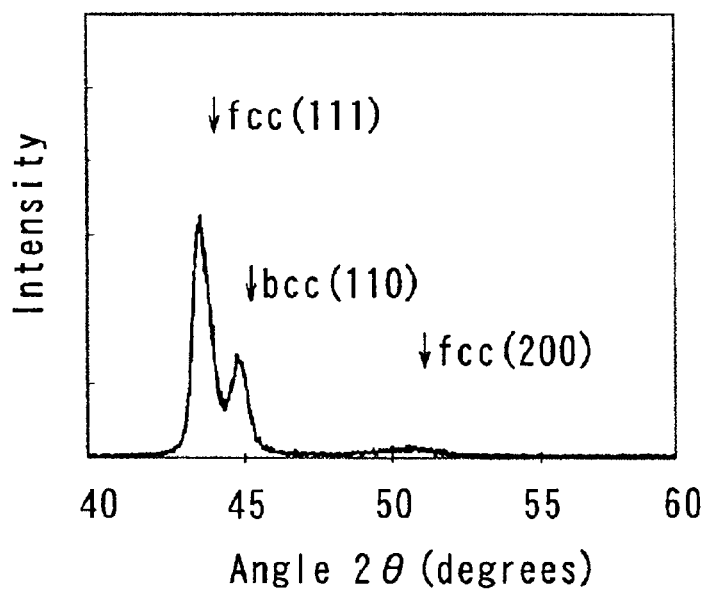
FIG. 23 is a characteristic diagram illustrating results of measurement of X-ray diffraction intensity on the sample with sample number 9 prepared in the second experiment.
Figure 24:
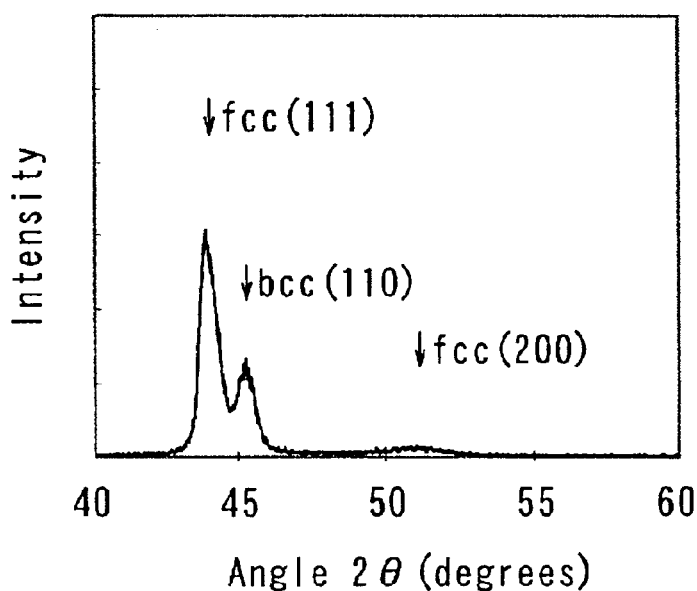
FIG. 24 is a characteristic diagram illustrating results of measurement of X-ray diffraction intensity on the sample with sample number 10 prepared in the second experiment.
Figure 25:
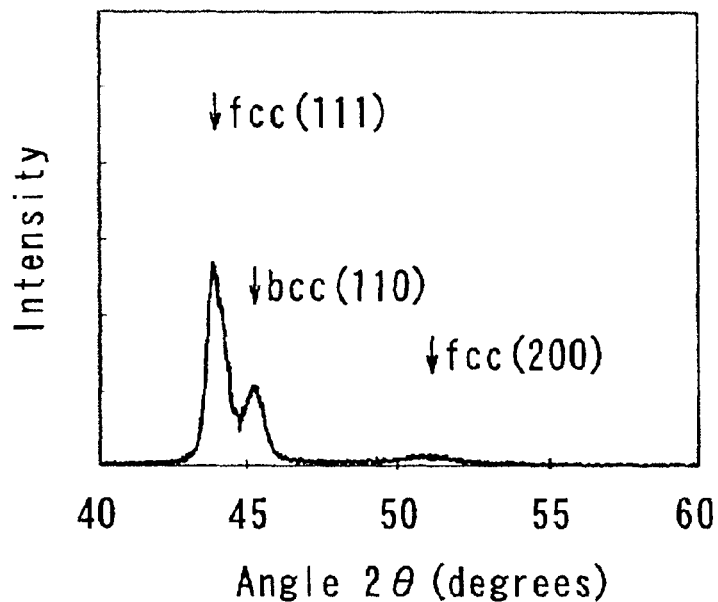
FIG. 25 is a characteristic diagram illustrating results of measurement of X-ray diffraction intensity on the sample with sample number 11 prepared in the second experiment.
Figure 26:
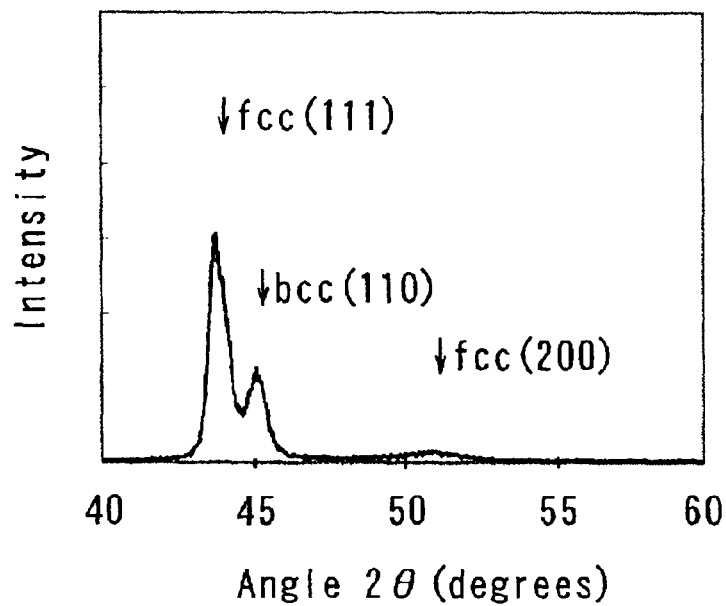
FIG. 26 is a characteristic diagram illustrating results of measurement of X-ray diffraction intensity on the sample with sample number 12 prepared in the second experiment.
Figure 27:
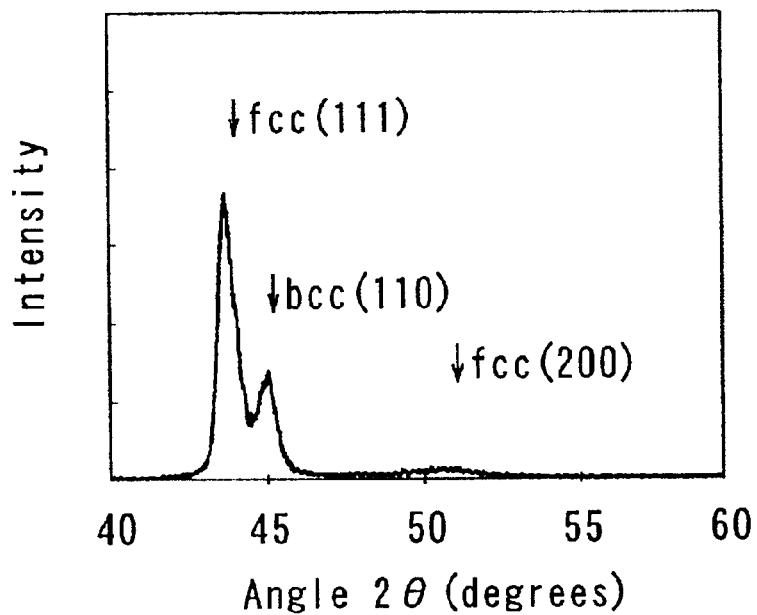
FIG. 27 is a characteristic diagram illustrating results of measurement of X-ray diffraction intensity on the sample with sample number 13 prepared in the second experiment.
Figure 28:
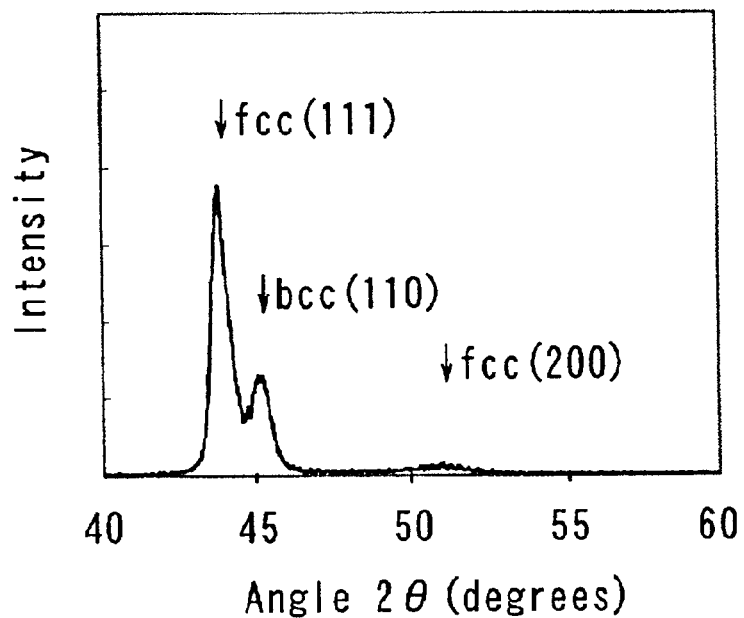
FIG. 28 is a characteristic diagram illustrating results of measurement of X-ray diffraction intensity on the sample with sample number 14 prepared in the second experiment.
Figure 29:
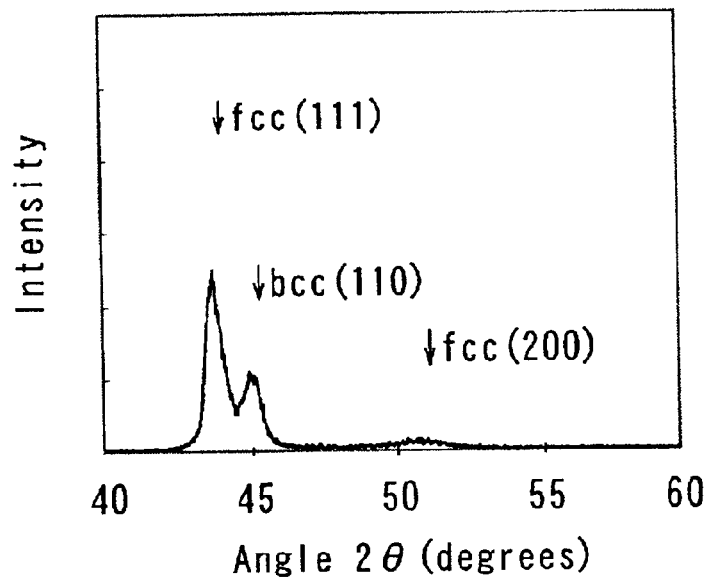
FIG. 29 is a characteristic diagram illustrating results of measurement of X-ray diffraction intensity on the sample with sample number 15 prepared in the second experiment.
Figure 30:
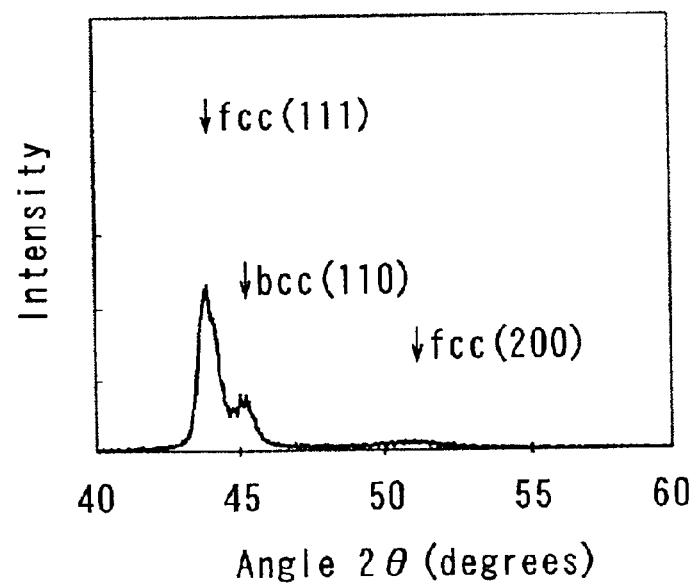
FIG. 30 is a characteristic diagram illustrating results of measurement of X-ray diffraction intensity on the sample with sample number 16 prepared in the second experiment.
Figure 31:
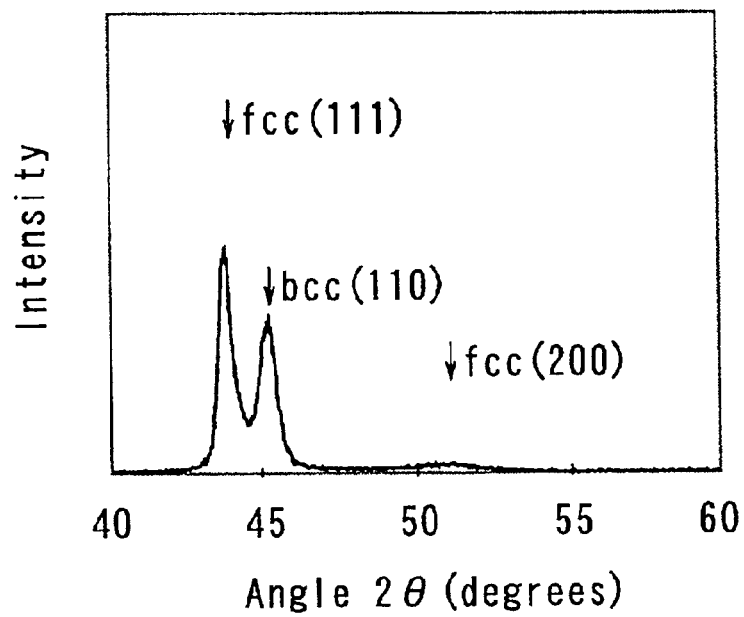
FIG. 31 is a characteristic diagram illustrating results of measurement of X-ray diffraction intensity on the sample with sample number 17 prepared in the second experiment.
Figure 32:
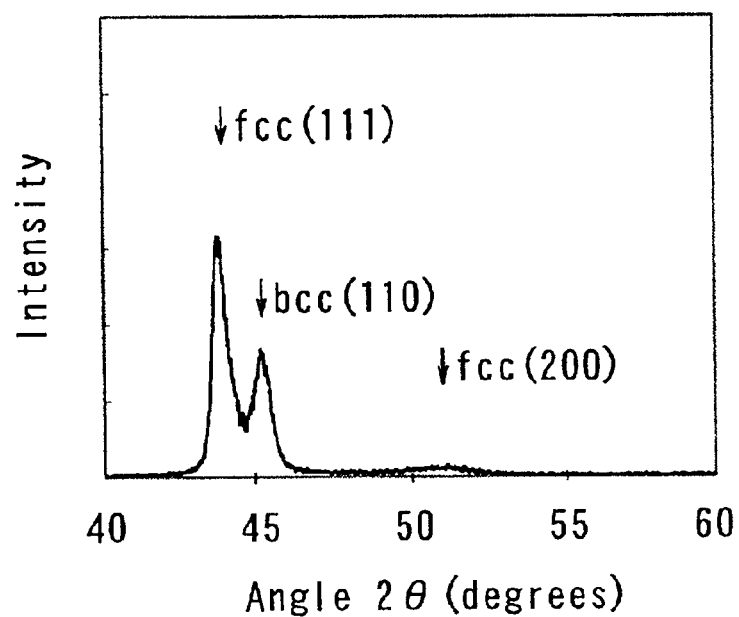
FIG. 32 is a characteristic diagram illustrating results of measurement of X-ray diffraction intensity on the sample with sample number 18 prepared in the second experiment.
Figure 33:
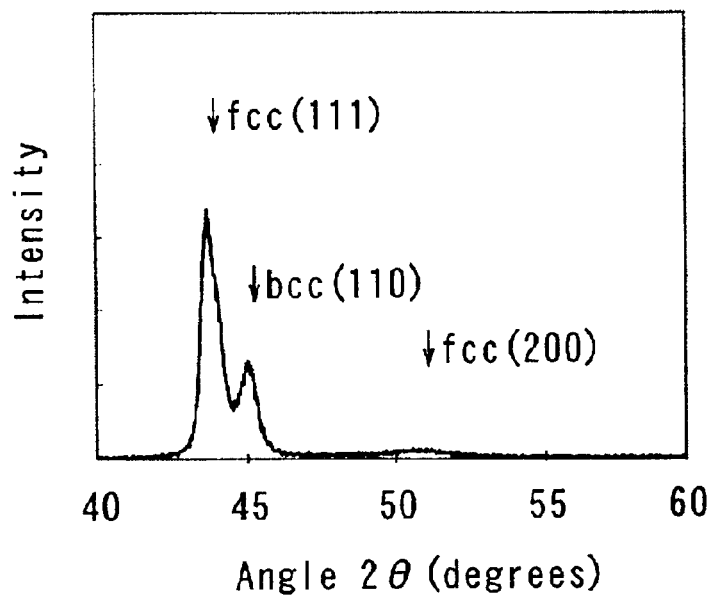
FIG. 33 is a characteristic diagram illustrating results of measurement of X-ray diffraction intensity on the sample with sample number 19 prepared in the second experiment.
Figure 34:
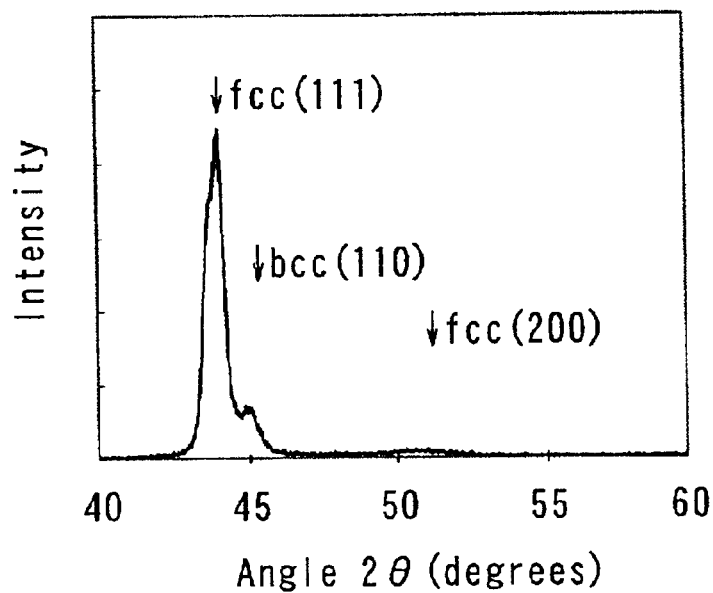
FIG. 34 is a characteristic diagram illustrating results of measurement of X-ray diffraction intensity on the sample with sample number 20 prepared in the second experiment.
Figure 35:
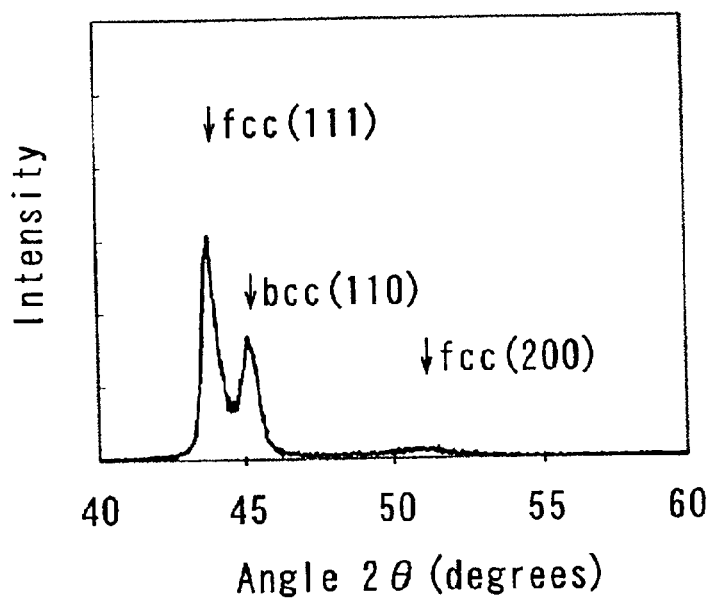
FIG. 35 is a characteristic diagram illustrating results of measurement of X-ray diffraction intensity on the sample with sample number 21 prepared in the second experiment.
Figure 36:
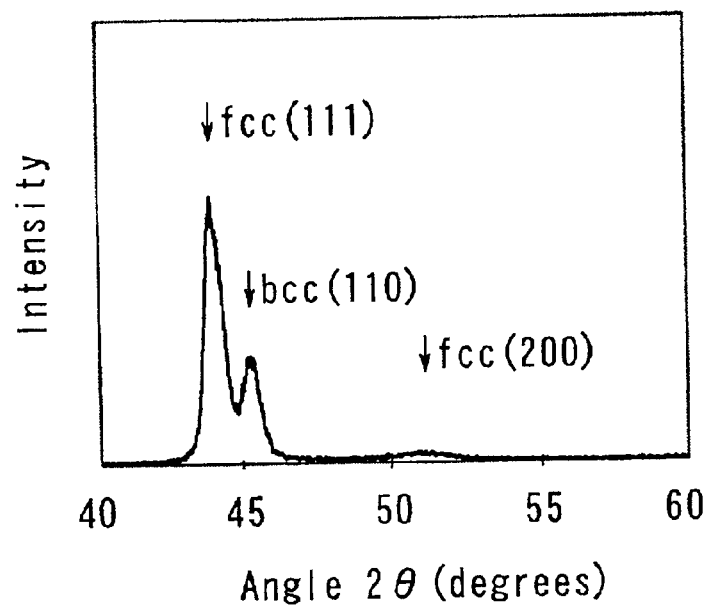
FIG. 36 is a characteristic diagram illustrating results of measurement of X-ray diffraction intensity on the sample with sample number 22 prepared in the second experiment.
Figure 37:
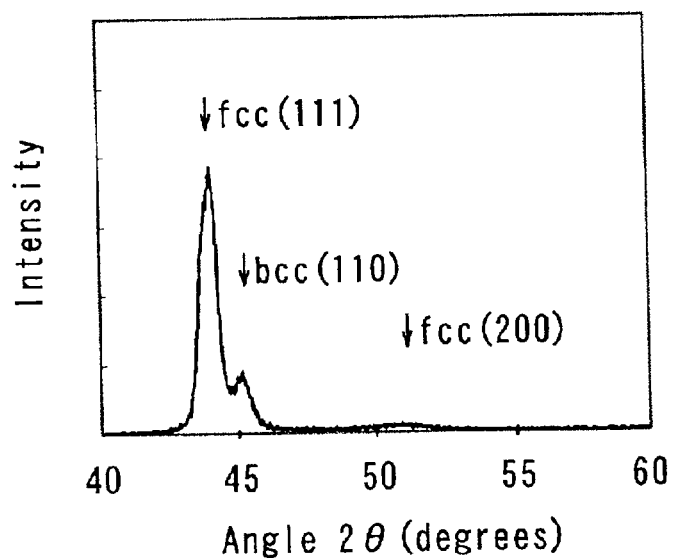
FIG. 37 is a characteristic diagram illustrating results of measurement of X-ray diffraction intensity on the sample with sample number 23 prepared in the second experiment.

FIG. 14 shows the relationship between the pH of the plating bath when forming the film and the Ib/If value observed on the samples with sample numbers 1 through 16 prepared in the second experiment. The samples had substantially the same compositions. In the compositions of the samples No. 1 through 16, cobalt contents ranged from 67 to 68 weight %; nickel contents ranged from 14.5 to 15.5 weight %; and iron contents ranged from 17 to 18 weight %. The straight line in FIG. 14 was decided using the least squares method.

It is apparent from FIG. 14 that an increase in the pH of the plating bath is accompanied by an increase in the Ib/If value. FIGS. 13 and 14 indicate that a saturation flux density Bs as high as 1.7 T or more can be achieved without changing the composition of a CoNiFe film by selecting a CoNiFe film composition in which the CoNiFe film has a saturation flux density Bs of 1.7 T or more and in which the CoNiFe film has a crystal structure that is a mixture of a body-centered cubic structure phase and a face-centered cubic structure phase, and by increasing the pH of the plating bath in a range in which no change occurs in the CoNiFe film composition. The first experiment indicated that the composition of a CoNiFe film was substantially constant regardless of the pH of the plating bath when the pH was 3.0 or more. When the pH of the plating bath is greater than 4.0, however, bivalent iron ions ($Fe^{2+}$) are likely to be oxidized into trivalent iron ions ($Fe^{3+}$). This is not preferable because a reaction expressed by $Fe^{3+})+3OH^- \rightarrow Fe(OH)_3 \downarrow$ occurs in the plating bath to produce deposits in the plating bath. Therefore, it is preferable that the pH of the plating bath is in the range of 3.0 to 4.0 inclusive. By controlling the pH within the range of 3.0 and 4.0 inclusive, the saturation flux density Bs may be controlled through control of the Ib/If value without changing the composition of the CoNiFe film.

The above-described results of the two experiments lead to the following conclusion. When the CoNiFe film containing 60 to 75 weight % cobalt, 10 to 20 weight % nickel, and 10 to 20 weight % iron and having a crystal structure that is a mixture of a body-centered cubic structure phase and a face-centered cubic structure phase is formed through electroplating, in order to obtain one having a saturation flux density as high as 1.7 T or more consistently, it is preferable to form the CoNiFe film such that Ib/If falls within the range of 0.3 to 0.7 inclusive. In addition, it is preferable to adjust the pH of the plating bath to 3.0 to 4.0 inclusive. Further, by controlling the pH of the plating bath within the range of 3.0 to 4.0 inclusive, the crystal structure or, more specifically, the Ib/If value, of the CoNiFe film may be controlled without changing the composition of the CoNiFe film, which makes it possible to control the saturation flux denity Bs. Especially, the saturation flux density Bs may be increased by increasing the pH of the plating bath within the range of 3.0 to 4.0 inclusive.

As described above, the CoNiFe film according to the present embodiment has a composition containing 60 to 75 weight % cobalt, 10 to 20 weight % nickel and 10 to 20 weight % iron, and a crystal structure that is a mixture of a body-centered cubic structure phase and a face-centered cubic structure phase, in which Ib/If is in the range of 0.3 to 0.7 inclusive. Therefore, the CoNiFe film is capable of providing a preferable soft magnetic property and a stable and high saturation flux density.

In the method of forming a CoNiFe film of the present embodiment, when forming the CoNiFe film that contains 60 to 75 weight % cobalt, 10 to 20 weight % nickel and 10 to 20 weight % iron and has a crystal structure that is a mixture of a body-centered cubic structure phase and a face-centered cubic structure phase through electroplating, the CoNiFe film is formed such that Ib/If falls within the range of 0.3 to 0.7 inclusive. Therefore, the method makes it possible to form a cobalt-nickel-iron alloy thin film having a preferable soft magnetic property and a stable and high saturation flux density.

According to the method of forming a CoNiFe film of the present embodiment, the pH of a plating bath for forming the CoNiFe film through electroplating is adjusted to 3.0 to 4.0 inclusive. The method therefore makes it possible to form a CoNiFe film having a preferable soft magnetic property and a stable and high saturation flux density while suppressing variations of the composition.

According to the method of forming a CoNiFe film of the present embodiment, the value of Ib/If is controlled by controlling the pH of the plating bath within the range of 3.0 and 4.0 inclusive. The method therefore makes it possible to control the saturation flux density of a CoNiFe film without changing the composition of the same.

In the thin-film magnetic head of the present embodiment, the track width defining layer 12a of the top pole layer 12 is made of a CoNiFe film. The CoNiFe of the present embodiment contains 60 to 75 weight % cobalt, 10 to 20 weight % nickel, and 10 to 20 weight % iron and has a crystal structure that is a mixture of a body-centered cubic structure phase and a face-centered cubic structure phase, in which Ib/If is in the range of 0.3 to 0.7 inclusive. Therefore, the thin-film magnetic head is capable of attaining stable and preferable recording characteristics.

According to the method of manufacturing a thin-film magnetic head of the present embodiment, the CoNiFe film used for the track width defining layer 12a of the top pole layer 12 is formed through electroplating, the CoNiFe film containing 60 to 75 weight % cobalt, 10 to 20 weight % nickel and 10 to 20 weight % iron and having a crystal structure that is a mixture of a body-centered cubic structure phase and a face-centered cubic structure phase, in which Ib/If is in the range of 0.3 to 0.7 inclusive. As a result, according to the embodiment it is possible to form a CoNiFe film having a preferable soft magnetic property and a stable and high saturation flux density, which consequently makes it possible to manufacture a thin-film magnetic head having stable and preferable recording characteristics.

In the method of manufacturing a thin-film magnetic head of the present embodiment, the pH of a plating bath for forming the CoNiFe film through electroplating is adjusted to 3.0 to 4.0 inclusive. Therefore, according to the method it is possible to form a CoNiFe film having a preferable soft magnetic property and a stable and high saturation flux density while suppressing variations of the composition of the CoNiFe film, and as a result, it is possible to manufacture a thin-film magnetic head having more stable and preferable recording characteristics.

According to the method of manufacturing a thin-film magnetic head of the present embodiment, the value of Ib/If is controlled by controlling the pH of the plating bath within the range of 3.0 to 4.0 inclusive. Therefore, according to the manufacturing method, it is possible to control the saturation flux density of the CoNiFe film without changing the composition of the same, which consequently makes it possible to control the recording characteristics of the thin-film magnetic head.

The invention is not limited to the foregoing embodiment, but various modifications are possible. For example, in the foregoing embodiment while the track width defining layer 12a of the top pole layer 12 is made of a CoNiFe film of the embodiment, the track defining layer 12a may be made up of a plurality of layers, some of the layers being made of the CoNiFe film of the embodiment. Further, portions of the top pole layer 12 other than the track width defining layer 12a and at least a part of the bottom pole layer 8 may be made of the CoNiFe film of the embodiment.

The foregoing embodiment referred to a thin-film magnetic head having a structure in which an MR element for reading is formed on a base body and an induction-type electromagnetic transducer for writing is stacked on the MR element. However, the MR element may be stacked on the electromagnetic transducer.

Specifically, the induction-type electromagnetic transducer for writing may be formed on the base body and the MR element for reading may be formed on the transducer. For example, such a structure may be achieved by forming a magnetic film functioning as the top pole layer of the foregoing embodiment as a bottom pole layer on the base body, and forming a magnetic film functioning as the bottom pole layer of the embodiment as a top pole layer facing the bottom pole layer with a write gap film in between.

The invention may be applied to a thin-film magnetic head comprising an induction-type electromagnetic transducer only and used for writing only, or may be applied to a thin-film magnetic head which performs writing and reading through an induction-type electromagnetic transducer.

The method of forming a cobalt-nickel-iron alloy thin film according to the invention may be applied to magnetic thin films to be used in devices other than thin-film magnetic heads.

As described above, the cobalt-nickel-iron alloy thin film of the present invention contains 60 to 75 weight % cobalt, 10 to 20 weight % nickel and 10 to 20 weight % iron, and has a crystal structure that is a mixture of a body-centered cubic structure phase and a face-centered cubic structure phase, in which Ib/If is in the range of 0.3 to 0.7 inclusive where Ib represents the intensity of an X-ray diffracted from a (110)-plane of the body-centered cubic structure and If represents the intensity of an X-ray diffracted from a (111)-plane of the face-centered cubic structure. Therefore, according to the cobalt-nickel-iron alloy thin film of the invention it is possible to attain a preferable soft magnetic property and a stable and high saturation flux density.

According to the method of forming a cobalt-nickel-iron thin film of the invention, when a cobalt-nickel-iron alloy thin film containing 60 to 75 weight % cobalt, 10 to 20 weight % nickel and 10 to 20 weight % iron, and having a crystal structure that is a mixture of a body-centered cubic structure phase and a face-centered cubic structure phase is formed through electroplating, the thin film is formed such that Ib/If falls within the range of 0.3 to 0.7 inclusive where Ib represents the intensity of an X-ray diffracted from a (110)-plane of the body-centered cubic structure and If represents the intensity of an X-ray diffracted from a (111)-plane of the face-centered cubic structure. Therefore, the invention makes it possible to form a cobalt-nickel-iron alloy thin film having a preferable soft magnetic property and a stable and high saturation flux density.

According to the method of forming a cobalt-nickel-iron alloy thin film of the invention, the pH of a plating bath for forming the cobalt-nickel-iron alloy thin film through electroplating may be adjusted to 3.0 to 4.0 inclusive. In this case, it is possible to form a cobalt-nickel-iron alloy thin film having a preferable soft magnetic property and a stable and high saturation flux density while suppressing variations of the composition.

According to the method of forming a cobalt-nickel-iron alloy thin film of the invention, the value of Ib/If may be controlled by controlling the pH of the plating bath within the range of 3.0 to 4.0 inclusive. In this case, it is possible to control the saturation flux density of the cobalt-nickel-iron alloy thin film without changing the composition of the same.

In the thin-film magnetic head of the invention, at least either of the first and second magnetic layers includes a part made of a cobalt-nickel-iron alloy thin film. The cobalt-nickel-iron alloy thin film contains 60 to 75 weight % cobalt, 10 to 20 weight % nickel and 10 to 20 weight % iron, and has a crystal structure that is a mixture of a body-centered cubic structure phase and a face-centered cubic structure phase, in which Ib/If is in the range of 0.3 to 0.7 inclusive where Ib represents the intensity of an X-ray diffracted from a (110)-plane of the body-centered cubic structure and If represents the intensity of an X-ray diffracted from a (111)-plane of the face-centered cubic structure. Therefore, according to the thin-film magnetic head of the invention it is possible to attain stable and preferable recording characteristics.

According to the method of manufacturing a thin-film magnetic head of the invention, the cobalt-nickel-iron alloy thin film to be used for at least either of the first and second magnetic layers is formed through electroplating, the cobalt-nickel-iron alloy thin film containing 60 to 75 weight % cobalt, 10 to 20 weight % nickel and 10 to 20 weight % iron, and having a crystal structure that is a mixture of a body-centered cubic structure phase and a face-centered cubic structure phase, in which Ib/If value is in the range of 0.3 to 0.7 inclusive where the Ib represents the intensity of an X-ray diffracted from a (110)-plane of the body-centered cubic structure and If represents the intensity of an X-ray diffracted from a (111)-plane of the face-centered cubic structure. Therefore, according to the invention it is possible to form a cobalt-nickel-iron alloy thin film having a preferable soft magnetic property and a stable and high saturation flux density, and as a result, it is possible to manufacture a thin-film magnetic head having stable and preferable recording characteristics.

According to the method of manufacturing a thin-film magnetic head of the invention, the pH of a plating bath for forming the cobalt-nickel-iron alloy thin film through electroplating may be adjusted to 3.0 to 4.0 inclusive. In this case, it is possible to form a cobalt-nickel-iron alloy thin film having a preferable soft magnetic property and a stable and high saturation flux density while suppressing variations of the composition of the cobalt-nickel-iron alloy thin film, and as a result, it is possible to manufacture a thin-film magnetic head having stable and preferable recording characteristics.

According to the method of manufacturing a thin-film magnetic head of the invention, the value of Ib/If may be controlled by controlling the pH of the plating bath within the range of 3.0 to 4.0 inclusive. In this case, it is possible to control the saturation flux density of the cobalt-nickel-iron alloy thin film without changing the composition of the same, which consequently makes it possible to control the recording characteristics of the thin-film magnetic head.

Obviously, many modifications and variations of the invention are possible in the light of the above teachings. It is therefore to be understood that within the scope of equivalence of the appended claims the invention may be practiced otherwise than as specifically described.

What is claimed is:

1. A cobalt-nickel-iron alloy thin film containing 60 to 75 weight % cobalt, 10 to 20 weight % nickel, and 10 to 20 weight % iron and having a crystal structure that is a mixture of a body-centered cubic structure phase and a face-centered cubic structure phase, wherein Ib/If is in the range of 0.37 to 0.7 inclusive where Ib represents the intensity of an X-ray diffracted from a (110)-plane of the body-centered cubic structure and If represents the intensity of an X-ray diffracted from a (111)-plane of the face-centered cubic structure.

2. A method of forming a cobalt-nickel-iron alloy thin film containing 60 to 75 weight % cobalt, 10 to 20 weight % nickel, and 10 to 20 weight % iron, and having a crystal structure that is a mixture of a body-centered cubic structure phase and a face-centered cubic structure phase through electroplating, wherein the cobalt-nickel-iron alloy thin film is formed such that Ib/If falls within the range of 0.37 to 0.7 inclusive where Ib represents the intensity of an X-ray diffracted from a (110)-plane of the body-centered cubic structure and If represents the intensity of an X-ray diffracted from a (111)-plane of the face-centered cubic structure.

3. A method of forming a cobalt-nickel-iron alloy thin film according to claim 2, wherein the pH of a plating bath for forming the cobalt-nickel-iron alloy thin film through electroplating is adjusted to 3.0 to 4.0 inclusive.

4. A method of forming a cobalt-nickel-iron alloy thin film according to claim 3, wherein the value of Ib/If is controlled by controlling the pH of the plating bath.

5. A thin-film magnetic head comprising:

a medium facing surface that faces toward a recording medium;

a first magnetic layer and a second magnetic layer magnetically coupled to each other and including magnetic pole portions that are opposed to each other and placed in regions of the magnetic layers on a side of the medium facing surface, each of the magnetic layers including at least one layer;

a gap layer provided between the magnetic pole portions of the first and second magnetic layers; and a thin-film coil at least a part of which is placed between the first and second magnetic layers, the at least part of the coil being insulated from the first and second magnetic layers, wherein:

at least either of the first and second magnetic layers includes a part made of a cobalt-nickel-iron alloy thin film; and the cobalt-nickel-iron alloy thin film contains 60 to 75 weight % cobalt, 10 to 20 weight % nickel, and 10 to 20 weight % iron, and has a crystal structure that is a mixture of a body-centered cubic structure phase and a face-centered cubic structure phase, in which Ib/If is in the range of 0.37 to 0.7 inclusive where Ib represents the intensity of an X-ray diffracted from a (110)-plane of the body-centered cubic structure and If represents the intensity of an X-ray diffracted from a (111)-plane of the face-centered cubic structure.

6. A method of manufacturing a thin-film magnetic head comprising: a medium facing surface that faces toward a recording medium; a first magnetic layer and a second magnetic layer magnetically coupled to each other and including magnetic pole portions that are opposed to each other and placed in regions of the magnetic layers on a side of the medium facing surface, each of the magnetic layers including at least one layer; a gap layer provided between the magnetic pole portions of the first and second magnetic layers; and a thin-film coil at least a part of which is placed between the first and second magnetic layers, the at least part of the coil being insulating from the first and second magnetic layers, wherein at least either of the first and second magnetic layers includes a part made of a cobalt-nickel-iron alloy thin film, the method including the steps of:

forming the first magnetic layer;

forming the gap layer on the first magnetic layer;

forming the second magnetic layer on the gap layer; and forming the thin-film coil, wherein at least either of the steps of forming the first magnetic layer and the second magnetic layer includes the step of forming the cobalt-nickel-iron alloy thin film through electroplating, the cobalt-nickel-iron alloy thin film containing 60 to 75 weight % cobalt, 10 to 20 weight % nickel, and 10 to 20 weight % iron, and having a crystal structure that is a mixture of a body-centered cubic structure phase and a face-centered cubic structure phase, in which Ib/If is in the range of 0.37 to 0.7 inclusive where Ib represents the intensity of an X-ray diffracted from a (110)-plane of the cubic-centered structure and If represents the intensity of an X-ray diffracted from a (111)-plane of the face-centered structure.

7. A method of manufacturing a thin-film magnetic head according to claim 6, wherein the pH of a plating bath for forming the cobalt-nickel-iron alloy thin film through electroplating is adjusted to 3.0 to 4.0 inclusive.

8. A method of manufacturing a thin-film magnetic head according to claim 7, wherein the value of Ib/If is controlled by controlling the pH of the plating bath.

9. A cobalt-nickel-iron alloy thin film formed by electroplating with a plating bath having a pH in the range of 3.0 to 4.0 inclusive, the cobalt-nickel-iron alloy thin film containing 60 to 75 weight % cobalt, 10 to 20 weight % nickel, and 10 to 20 weight % iron and having a crystal structure that is a mixture of a body-centered cubic structure phase and a face-centered cubic structure phase, wherein Ib/If is in the range of 0.37 to 0.7 inclusive where Ib represents the intensity of an X-ray diffracted from a (110)-plane of the body-centered cubic structure and If represents the intensity of an X-ray diffracted from a (111)-plane of the face-centered cubic structure.

10. A cobalt-nickel-iron alloy thin film formed by electroplating with a plating bath having a pH in the range of 3.0 to 4.0 inclusive, the cobalt-nickel-iron alloy thin film containing 60 to 75 weight % cobalt, 10 to 20 weight % nickel, and 10 to 20 weight % iron and having a crystal structure that is a mixture of a body-centered cubic structure phase and a face-centered cubic structure phase, wherein Ib/If is in the range of 0.37 to 0.7 inclusive where Ib represents the intensity of an X-ray diffracted from a (110)-plane of the body-centered cubic structure and If represents the intensity of an X-ray diffracted from a (111)-plane of the face-centered cubic structure.

11. A thin-film magnetic head comprising:

a medium facing surface that faces toward a recording medium;

a first magnetic layer and a second magnetic layer magnetically coupled to each other and including magnetic pole portions that are opposed to each other and placed in the regions of the magnetic layers on a side of the medium facing surface, each of the magnetic layers including at least one layer;

a gap layer provided between the magnetic pole portions of the first and second magnetic layers; and a thin-film coil at least a part of which is placed between the first and second magnetic layers, the at least part of the coil being insulated from the first and second magnetic layers, wherein:

at least either of the first and second magnetic layers includes a part made of a cobalt-nickel-iron alloy thin film; and the cobalt-nickel-iron alloy thin film is formed by electroplating with a plating bath having a pH in the range of 3.0 to 4.0 inclusive, the cobalt-nickel-iron alloy thin film containing 60 to 75 weight % cobalt, 10 to 20 weight % nickel, and 10 to 20 weight % iron and having a crystal structure that is a mixture of a body-centered cubic structure phase and a face-centered cubic structure phase, wherein Ib/If is in the range of 0.37 to 0.7 inclusive where Ib represents the intensity of an X-ray diffracted from a (110)-plane of the body-centered cubic structure and If represents the intensity of an X-ray diffracted from a (111)-plane of the face-centered cubic structure.

12. A thin-film magnetic head comprising:

a medium facing surface that faces toward a recording medium;

a first magnetic layer and a second magnetic layer magnetically coupled to each other and including magnetic pole portions that are opposed to each other and placed in the regions of the magnetic layers on a side of the medium facing surface, each of the magnetic layers including at least one layer;

a gap layer provided between the magnetic pole portions of the first and second magnetic layers; and a thin-film coil at least a part of which is placed between the first and second magnetic layers, the at least part of the coil being insulated from the first and second magnetic layers, wherein:

at least either of the first and second magnetic layers includes a part made of a cobalt-nickel-iron alloy thin film; and the cobalt-nickel-iron alloy thin film is formed by electroplating with a plating bath having a pH in the range of 3.0 to 4.0 inclusive, the cobalt-nickel-iron alloy thin film containing 60 to 75 weight % cobalt, 10 to 20 weight % nickel, and 10 to 20 weight % iron and having a crystal structure that is a mixture of a body-centered cubic structure phase and a face-centered cubic structure phase, wherein $Ib/If$ is in the range of 0.37 to 0.7 inclusive where $Ib$ represents the intensity of an X-ray diffracted from a (110)-plane of the body-centered cubic structure and $If$ represents the intensity of an X-ray diffracted from a (111)-plane of the face-centered cubic structure.

* * * * *

UNITED STATES PATENT AND TRADEMARK OFFICE
CERTIFICATE OF CORRECTION

PATENT NO. : 6,797,415 B2
DATED : September 28, 2004
INVENTOR(S) : Atsushi Yamaguchi et al.

It is certified that error appears in the above-identified patent and that said Letters Patent is hereby corrected as shown below:

Column 12,
Line 60, should read -- preferably because a reaction expressed by $Fe^{3+} + 3OH^-$ --.

Column 18,
Lines 11-22, should be deleted.
Line 23, should read -- 10. A thin-film magnetic head comprising: --
Lines 54-67, should be deleted.

Column 19,
Lines 1-10, should be deleted.

Column 20,
Lines 1-8, should be deleted.

Signed and Sealed this

Twenty-fifth Day of January, 2005

JON W. DUDAS
*Director of the United States Patent and Trademark Office*